US011093110B1

(12) United States Patent
Bossio et al.

(10) Patent No.: US 11,093,110 B1
(45) Date of Patent: Aug. 17, 2021

(54) MESSAGING FEEDBACK MECHANISM

(71) Applicant: Amazon Technologies, Inc., Seattle, WA (US)

(72) Inventors: Lee Michael Bossio, Watertown, CT (US); Matthew Darren Choate, Crafton, PA (US); Kartik Suchindra Babu, Pittsburgh, PA (US); Logan Gray Chittenden, Westbrook, CT (US); John Thomas Beck, Bethel Park, PA (US)

(73) Assignee: Amazon Technologies, Inc., Seattle, WA (US)

( * ) Notice: Subject to any disclaimer, the term of this patent is extended or adjusted under 35 U.S.C. 154(b) by 666 days.

(21) Appl. No.: 15/651,523

(22) Filed: Jul. 17, 2017

(51) Int. Cl.
*G06F 3/0482* (2013.01)
*G06F 3/16* (2006.01)
*G06F 3/0481* (2013.01)
*G06F 3/0488* (2013.01)
*G10L 15/18* (2013.01)
*G06F 40/44* (2020.01)

(52) U.S. Cl.
CPC .......... *G06F 3/0482* (2013.01); *G06F 3/0488* (2013.01); *G06F 3/04817* (2013.01); *G06F 3/167* (2013.01); *G06F 40/44* (2020.01); *G10L 15/18* (2013.01)

(58) Field of Classification Search
None
See application file for complete search history.

(56) References Cited

U.S. PATENT DOCUMENTS

| 6,583,798 | B1 * | 6/2003 | Hoek | G06F 40/166 |
| | | | | 715/822 |
| 7,207,004 | B1 * | 4/2007 | Harrity | G06F 40/242 |
| | | | | 715/236 |
| 2007/0025529 | A1 * | 2/2007 | Romeo | H04W 4/18 |
| | | | | 379/88.14 |
| 2007/0208813 | A1 * | 9/2007 | Blagsvedt | H04L 51/063 |
| | | | | 709/206 |
| 2007/0294078 | A1 * | 12/2007 | Kim | G06F 40/58 |
| | | | | 704/2 |
| 2008/0313534 | A1 * | 12/2008 | Cheung | H04L 12/1827 |
| | | | | 715/254 |
| 2009/0124272 | A1 * | 5/2009 | White | G10L 15/193 |
| | | | | 455/466 |
| 2009/0164914 | A1 * | 6/2009 | Chen | G06Q 10/107 |
| | | | | 715/753 |

(Continued)

*Primary Examiner* — Mandrita Brahmachari
(74) *Attorney, Agent, or Firm* — Pierce Atwood LLP

(57) ABSTRACT

Offered is a system and devices that can provide additional functionality to device-to-device messaging. The system may translate message content from one language into other languages depending on the language preferences of the operating users. The system can also enable a user to respond to a message using a graphical user interface (GUI) element and, in response to the selection of that element, enable additional functionality. The additional functionality may include, for example, offering an originator of the message menu options to select different message content (such as different text corresponding to alternate speech recognition results if the message was originally spoken), the option to select a different translation of the original message content (through a back translation operation) or other options.

28 Claims, 14 Drawing Sheets

(56) References Cited

U.S. PATENT DOCUMENTS

| | | | |
|---|---|---|---|
| 2009/0240488 A1* | 9/2009 | White | G06F 3/0236 704/9 |
| 2010/0050074 A1* | 2/2010 | Nachmani | G06F 40/274 715/257 |
| 2012/0303445 A1* | 11/2012 | Jablokov | G06Q 30/02 705/14.42 |
| 2015/0089389 A1* | 3/2015 | Cohen-Zur | H04W 4/12 715/752 |
| 2015/0207765 A1* | 7/2015 | Brantingham | H04L 51/046 715/758 |
| 2015/0278175 A1* | 10/2015 | Dua | G06F 40/40 704/9 |
| 2015/0310757 A1* | 10/2015 | Moon | G09B 7/04 434/350 |
| 2016/0019402 A1* | 1/2016 | Khandelwal | G06F 21/6254 726/26 |
| 2016/0117299 A1* | 4/2016 | Hynes | G06F 40/274 715/256 |
| 2016/0191448 A1* | 6/2016 | Eck | H04L 51/32 709/206 |
| 2016/0294755 A1* | 10/2016 | Prabhu | H04L 51/046 |
| 2017/0180276 A1* | 6/2017 | Gershony | H04L 51/02 |
| 2017/0249291 A1* | 8/2017 | Patel | H04L 51/063 |
| 2017/0295119 A1* | 10/2017 | Rosenberg | H04L 51/046 |
| 2018/0191860 A1* | 7/2018 | Ghafourifar | H04L 67/32 |
| 2018/0302345 A1* | 10/2018 | Landowski | G06Q 10/103 |
| 2018/0367484 A1* | 12/2018 | Rodriguez | H04L 65/403 |

* cited by examiner

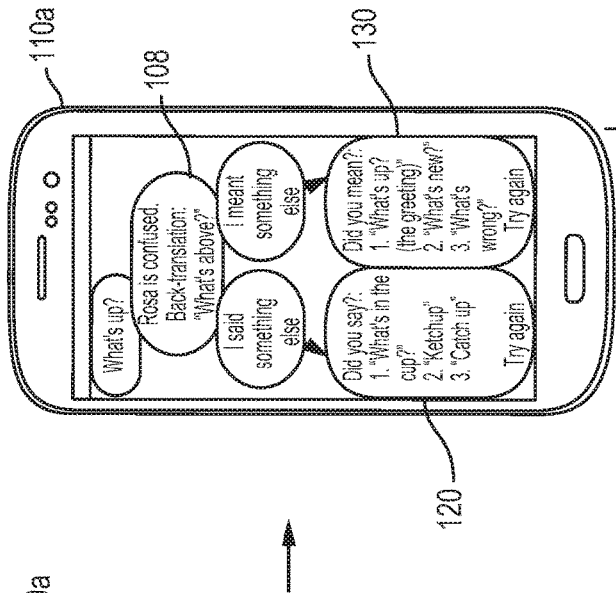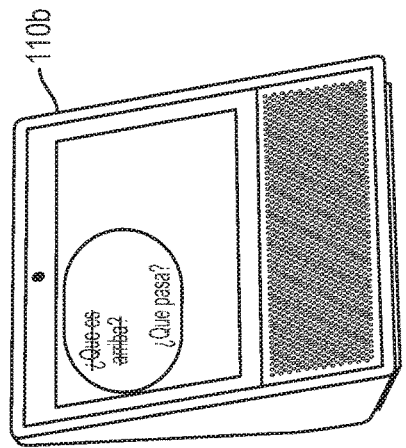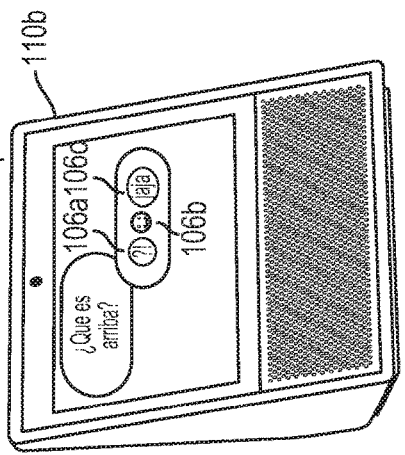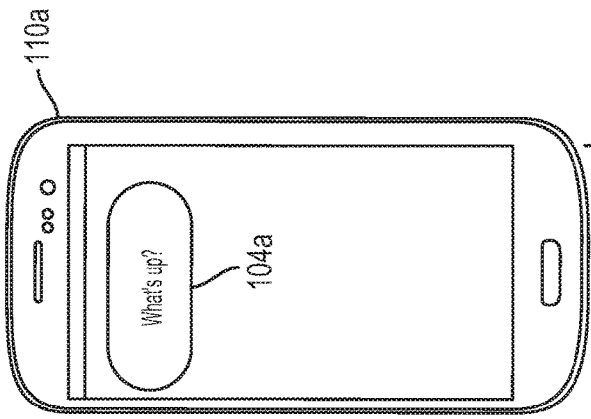

MESSAGING FEEDBACK MECHANISM

BACKGROUND

Various existing systems and techniques allow the exchange of messages between computing devices. Examples include Short Message Service (SMS) and group messaging services.

Statistical machine translation systems generate translations on the basis of statistical models derived from an analysis of bilingual text. In particular, text segments can be translated based upon a probability distribution that a segment in a target language (e.g., Spanish) is a translation of a segment in a source language (e.g., English).

Automatic speech recognition (ASR) is a field of computer science, artificial intelligence, and linguistics concerned with transforming audio data associated with speech into text data representative of that speech. The resulting text data may, for example, be provided to various text-based software applications. Such systems employ techniques to identify the words spoken by a human user based on the various qualities of a received audio input.

BRIEF DESCRIPTION OF DRAWINGS

For a more complete understanding of the present disclosure, reference is now made to the following description taken in conjunction with the accompanying drawings.

FIGS. 1A-1F illustrate a sequential exchange and display of messages between a first device (shown in FIGS. 1A, 1D, and 1E) that displays text in English and a second device (shown in FIGS. 1B, 1C, and 1F) that displays text in Spanish;

DETAILED DESCRIPTION

Figure 2:
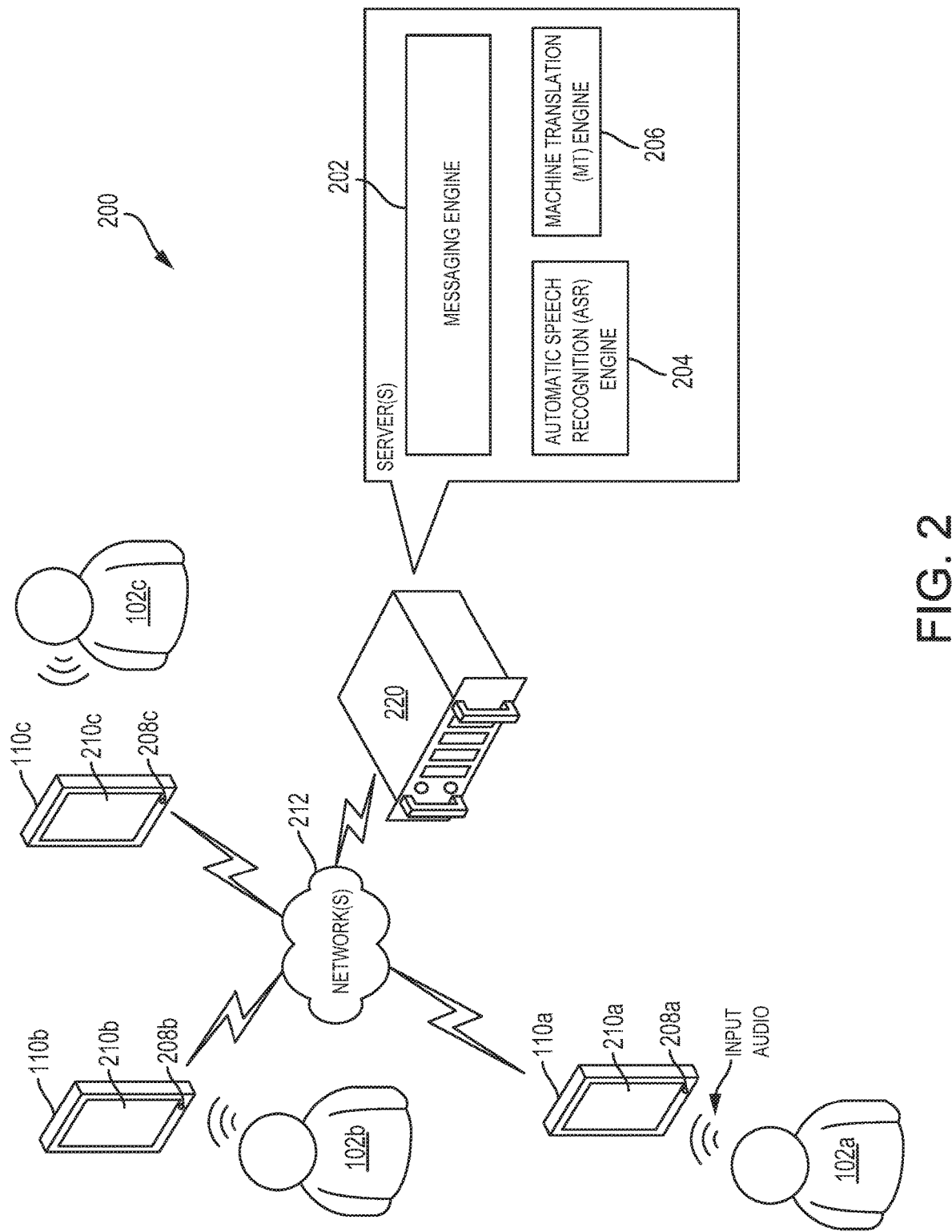
FIG. 2 is a diagram of components of a voice-operable, multi-lingual text messaging system according to embodiments of the present disclosure.

Offered is a system in which users can interact with computing devices, either by speaking or by manually entering text, to generate, exchange, and edit messages in different languages. The exchanged messages can be translated into one or more different languages and presented to each participating user in the language of that user's choice. The system also allows users to react to the individual messages and translations. Those reactions may trigger additional functionality, such as functionality used to correct a translation. For example, if a user receives a message to which the user wants to react in some fashion, that user may select (e.g., tap on) the message to obtain a list of available emojis (i.e., small digital images or icons used to express ideas or emotions) or other graphical user interface (GUI) elements that can be selected to signify a corresponding reaction. One such emoji may, for example, signify that the user believes the message might have been inaccurately translated from one language to another. When an emoji is selected for a given message, the system may cause the emoji (or other indicator) to appear, along with some corresponding message, on other participants' displays. The "tagging" of a message with an indicator in this fashion can enable additional functionality with respect to the message in question. For example, the originator of a tagged message may subsequently take steps to amend or replace the message. In some implementations, the type of indicator (which may be a GUI element, text, audible indicator, or some other indicator) accompanying a message can suggest the type of response that might be appropriate.

FIGS. 1A-F illustrate an example scenario in which two computing devices 110a and 110b participate in a multi-lingual message exchange. During the exchange, a first user for the first device 110a sends messages in a first language (English) which are then translated by the system into another language (Spanish). The system displays the messages in the second language on the second device 110b. The second user of the second device may operate the second device 110b to view a graphical user interface (GUI) element, e.g., an emoji, that the second user can use to solicit a response from the originator of the message (i.e., the first user). Although only two devices 110a, 110b are shown, it should be appreciated that messages and GUI elements like that described can likewise be exchanged among three or more devices, e.g., in a "group chat" session.

As shown in FIG. 1A, a user of a computing device 110a may initiate a text message 104a in a particular language, in this case English, that is to be distributed among the devices participating in the exchange. In some implementations, the user may speak an utterance including the message content to device 110a (or another speech capture device) and an automatic speech recognition (ASR) engine (described in more detail below) and/or other speech processing components may convert the utterance into the text message 104a. In other cases, the user may type or otherwise manually input the text for the message 104a, or the message may be generated by analysis of a video signal, e.g., to recognize sign language or other gestures, recognize objects, or recognized text on a street sign or object.

Once the message content is obtained by one or more server(s) 220 (not shown in FIGS. 1A-1F), the server(s) 220 may initiate translation of the message content from one language to another. The translation from one language to another can be accomplished, for example, using a machine translation (MT) engine (also described in more detail below). The translated message content, now in the second language, may be sent to a recipient device (110b) for display. As shown in FIG. 1B, the other computing device 110b may then display a version 104b of the text message that has been translated into a different language, in this case Spanish. It should be appreciated that messages exchanged between devices 110 need not be presented on displays in all implementations, and instead may be presented by the devices 110 via speakers or other output mechanism.

In the example of FIG. 1B, the first user's message content of "what's up?" has been translated by the system as "¿Que es arriba?" In this case, the second user (of device 110b) finds the translated message 104b confusing, because it seems to be asking "What is above?" and that phrase does not seem to fit within the context of the ongoing discussion. The user of device 110b may then select (e.g., tap on) a portion of the display of device 110b corresponding to the confusing message 104b and, in response, be provided with a group of one or more GUI elements from which the user can select. An example set of possible GUI elements 106a-c is shown in FIG. 1C. In this particular case, the user is presented with a first GUI element 106a ☺ "?!" expressing confusion, a second GUI element 106b "☺" expressing happiness, and a third GUI element 106c "jaja" expressing laughter (a Spanish equivalent of LOL). Different GUI options may be presented to a user depending on the device or user's profile language settings. In this example, because the second user is confused, the second user selects the "confusion" GUI element 106a.

In some implementations, the system may additionally or alternatively be configured to allow a user to provide feedback to a message in ways other than by selecting a displayed GUI element, e.g., by verbally expressing a reaction or expressing a reaction using a physical gesture. For example, in response to a new message being displayed and/or output via a speaker, the system may detect a user's confusion, e.g., using a microphone and/or camera, by identifying when the user says "what does that mean?," or when the user's palms up are turned up and raised in the air slightly, or perhaps even just when one or both of the user's eyebrows are raised.

In any event, an indication of the second user's selection of GUI element 106a (or other responsive input) is then sent to a remote device, such as a communication server. The server may then associate the original message 104a with an indicator that there was some confusion involved with that particular message. The server may also enable certain functionality with regard to the original message 104a, discussed below.

The server may also send a command to device 110a to display, as shown in FIG. 1D, the confusion GUI element 106a in a manner associated with the corresponding message 104a on the device 110a. In some implementations, the association between the GUI element 106a and the message 104a can be distributed to the devices of all participating users. In other cases, the association may be distributed only to a subset of the users' devices, e.g., the device of the user who initiated the tagged message. As shown in FIG. 1D, the GUI element 106a may be displayed next to, above, below and/or partially overlapping with a portion of the display associated with the original message 104a.

When the user of device 110a sees that the original message "What's Up?" has been tagged as confusing, the user knows that functionality has now been enabled that will allow the user to perform other actions, for example, to amend or replace, or otherwise respond, to the tagged message. That enabled functionality may be accessed, for example, by the user of device 110a selecting (e.g., tapping) the tagged message and/or the associated GUI element. In some implementations, such additional functionality is not available unless and until a message has been tagged (e.g., the message content has been associated with some additional functionality).

In some implementations, in addition to or in lieu of displaying a GUI element to alert the user 110a that someone has provided feedback concerning an outgoing message, the system may cause the device 110a to present such an alert using other mechanisms. For example, in some embodiments, the system may additionally or alternatively be configured to present an audible indication concerning such feedback, e.g., outputting the phrase "Rosa found your message confusing?" via a speaker, or to visually present information other than on a display, e.g., via a blinking red light or the like.

As shown in FIG. 1E, upon selecting the tagged message 104a and/or GUI element 106a, the user of device 110a may be presented with a menu, or sequence of menus, the user can navigate to identify an appropriate response, if any, to the GUI element 106a. In the example shown, the user is presented with an explanation block 108 identifying both the user who generated the tag ("Rosa is confused") and a back-translation of the phrase in question ("Back-translation: What's above?"). The back-translation may be obtained by one or more server(s) 220 (such as a server running an MT engine) obtaining the translated text in the second language, translating that translated text back into the first language (e.g., the back-translation text), and sending that back-translation text to the device 110a. The device may also present to the user one or more menu categories to select from. In the illustrated example, the device presents the user with one menu 120 presenting alternate options for what the user said and one menu 130 presenting alternate options for what the user meant. The user is able to try to correct the ASR result by tapping "I said something else," or to try to correct the MT result by tapping "I meant something else." The user may choose to "go back" to a previous step at any point, for example, by tapping elsewhere on the screen or tapping a designated "go back" or other button (not illustrated).

As FIG. 1E also illustrates that, by tapping on certain menu categories, the user of device 110a may be presented with a list of possible options for amending or replacing the tagged message. In the example shown, tapping the "I said something else" option reveals a list 120 of certain N-best ASR results below the one that was initially selected. The user can either choose one of those results or choose to "Try again" and then utter or type a new message. Similarly, tapping on the "I meant something else" option reveals a list of back-translations 130 of the N-best MT results below the one that was initially selected. And again, the user can either choose one of those results or choose to "Try again" and then utter or type a new message. In some implementations, such as where screen space is not a limiting factor (e.g., on a desktop or laptop computer display) or where only a single type of response option (e.g., "I meant something else") is available or enabled, e.g., based on user preference settings, upon selecting the tagged message or GUI element, the user can simply be presented with a list of all available options for amending or replacing the tagged message, without having to navigate a menu hierarchy to reach the list.

FIG. 1F shows an example of how a tagged message can be amended or replaced, in this case in response to the user of device 110a selecting the "I meant something else" menu option, and then selecting "1. What's up? (the greeting)". For example, upon the device 110a detecting the user has selected item "1" from menu 130, the device 110a may send an indicator of the user's selection (or of the touchscreen location) to the server(s) 220. The server(s) 220 may then determine a new translation for the selection and send a command instructing device 110b to create the modified message shown in FIG. 1F. As seen, the initially inaccurate translation "Que es arriba?" has been stricken-through and replaced with "Que pasa?" In some implementations, the "confusion tag" may be removed from the "What's up?" message at the same time to signify that the source of confusion has been addressed.

Again, it should be appreciated that, in some implementations, the system may be configured to allow the user 110a to indicate a desire to respond to the feedback from user 110b in ways other than by selecting GUI elements, navigating a menu, etc., via a display. In some embodiments, for example, that system may additionally or alternatively be configured to allow the user 110a to respond to the feedback verbally, for instance, by saying "Why was Rosa confused?," and then navigating an audible menu, e.g., using verbal commands, to select an amended or replacement version of the prior message.

In some implementations, the functionality described herein can be achieved using three core software engines: (1) a messaging engine, (2) an ASR engine, and (3) an MT engine. As discussed in more detail below, in some embodiments, a natural language understanding (NLU) module may additionally be employed. Each of these engines/modules can be configured and implemented in various ways, and the particular configuration and/or implementation of each is not critical. They can be executed in some combination of hardware, software and/or firmware across one or multiple physical servers or other devices. In some embodiments, for example, most, if not all, software resources may be located on one or more servers and may be accessed by user devices on an as needed basis. In other implementations, resources may be distributed between servers and end-user devices. In yet other implementations, most, if not all, resources may be located on and executed by end-user devices.

FIG. 2 illustrates an example implementation of a voice-operable, multi-lingual message exchange system 200 in which a messaging engine 202, an ASR engine 204, and an MT engine 206 are all located on one or more servers 220. It should be appreciated that element 220 in FIG. 2 may represent any number of discrete servers or clusters of servers, and each of the software modules 202, 204, 206 may either run on the same server or server group as one or more of the other modules, or may run on different servers or server groups.

In some implementations, messaging engine 202 of system 200 (FIG. 2) may be located at the "hub" of a "hub-and-spoke" network. In this configuration, all messages from user devices 110a-c are communicated to the messaging engine 202 and the messaging engine 202 then distributes or broadcasts such messages to one or more other devices that are participating in a "chat"/messaging session. In other implementations, the messaging engine 202 may be distributed among user devices 110 and server(s) 220, and at least some messages may be communicated from one user device to another without passing through server(s) 220 or otherwise being processed by a server-based component of the messaging engine 202. In any case, in addition to basic messaging functionality, the messaging engine 202 may be provided with specialized GUI element (e.g., emoji) processing components that allow certain advantageous functionalities discussed herein.

As shown, each user device 110 may include a microphone 208 and a display screen 210. Although not illustrated in FIG. 2, each user device may also include one or more microprocessors, memory/storage elements, and communications modules typical of conventional electronic devices, which components can operate, in conjunction with the microphone 208 and display screen 210, etc., to allow the users 102 to interact with the devices 110 and allow the devices 110 to communicate with one or more servers 220 via one or more network(s) 212 in the manner discussed herein. In some implementations, one or more of the display screens 210 may be touch-screens with which the users may provide inputs to the devices, e.g., by touching, tapping, swiping, etc. Additionally or alternatively, one or more of the devices 110 may be provided with one or more other user input mechanisms (not illustrated), such as a keyboard, mouse, etc. Additional information concerning example embodiments of the user devices 110 is provided below in connection with FIGS. 10 and 12.

It should likewise be appreciated that each of the one or more servers 220 may also include one or more processors, memory/storage elements, and communications modules that can operate to execute the software engines 202, 204, 206, communicate with the user devices 110 via the network 212, and otherwise achieve the functionality discussed herein. Additional information concerning example embodiments of the server(s) 220 is provided below in connection with FIGS. 11 and 12.

Figure 3A:
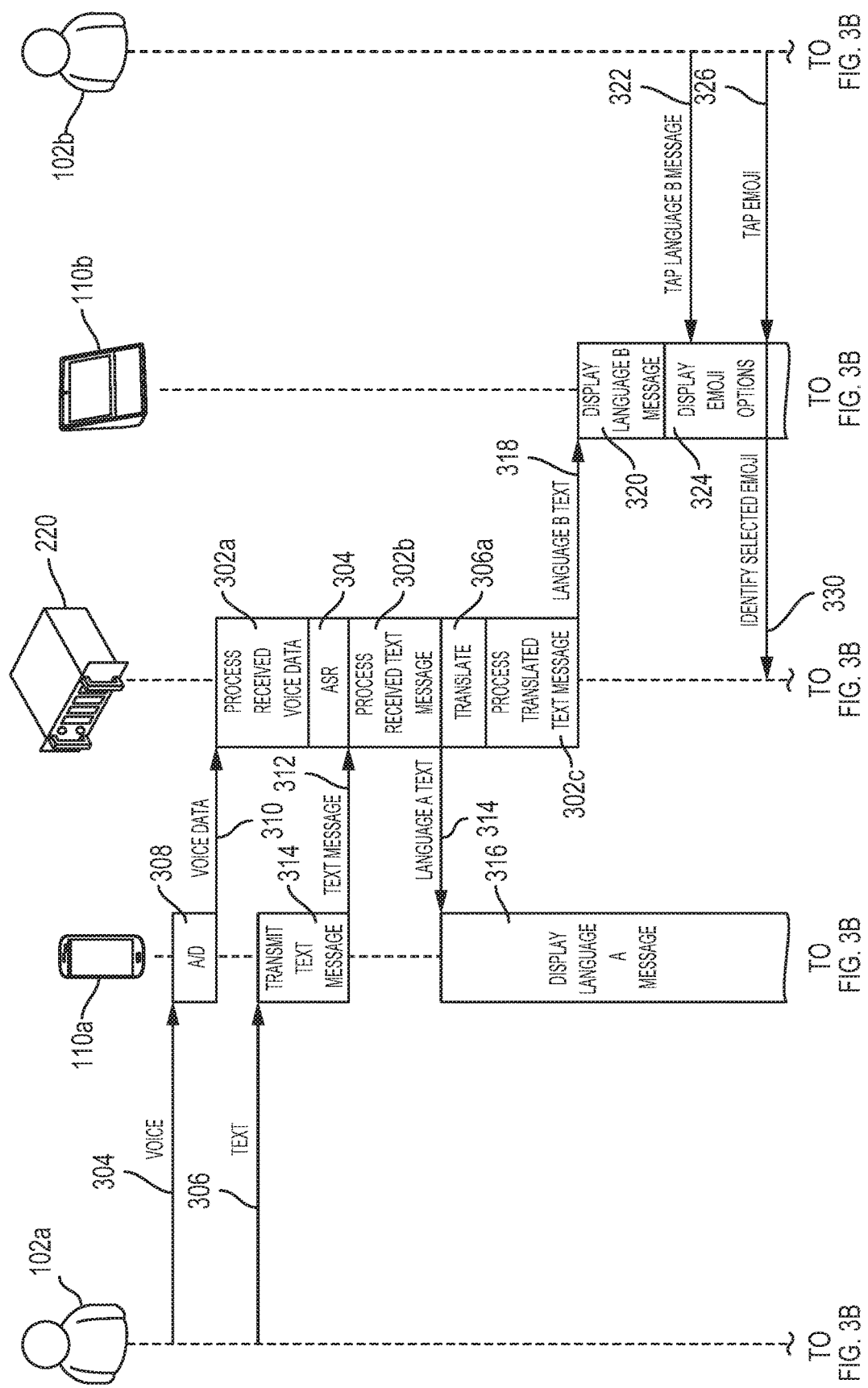
FIGS. 3A and 3B are a sequence diagram illustrating an example implementation a voice-operable, multi-lingual text messaging system according to embodiments of the present disclosure.
Figure 3B:
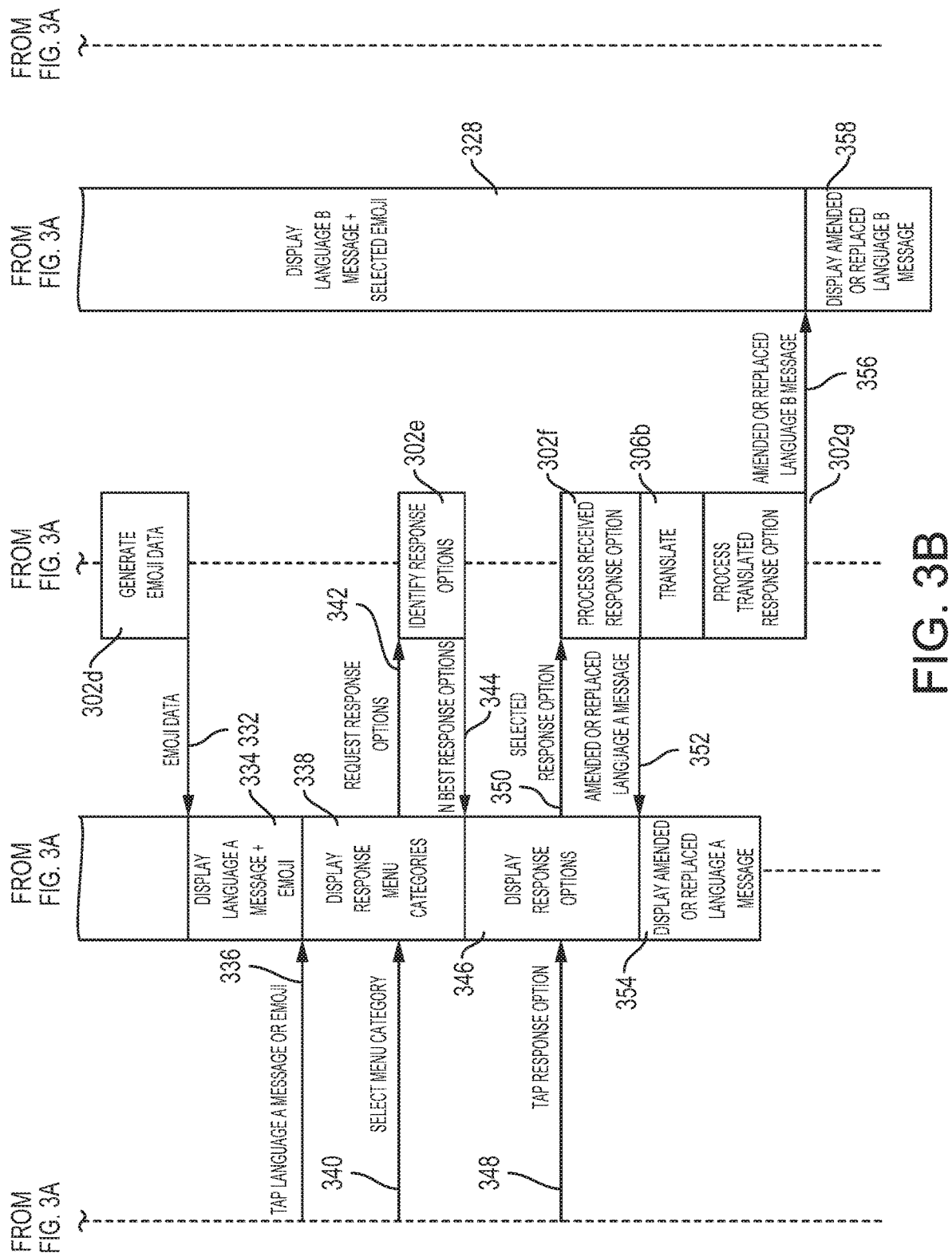

FIGS. 3A-3B show a sequence diagram for an implementation of the messaging system 200. FIGS. 3A-3B illustrate an example of a messaging and translation exchange where additional functionality may be selected and executed in a manner similar to that discussed above in reference to FIGS. 1A-1F. As shown in FIGS. 3A and 3B, the exchange may involve two user devices 110a, 110b, and in which the software of messaging engine 202, ASR engine 204, and MT engine 206 are located on one or more servers 220. In the example shown, actions 302a-g may be performed by the messaging engine 202, action 304 may be performed by the ASR engine 204, and actions 306a-b may be performed by the MT engine 206, though other configurations are also possible. The engines 202, 204, 206 may, for example, be in communication with each other and need not be co-located. In some implementations, the messaging engine 202, ASR engine 204 and MT engine 206 are services that can be called, as needed, by one another. FIGS. 3A-3B thus correspond, for example, with a hub-and-spoke implementation, as all messages between end-user devices 110 are received and processed by the messaging engine 202 prior to being distributed or broadcasted to the other end-user devices 110.

In the example implementation shown, each user device 110a-b need only have basic functionality in order to engage in message passing as described, such as the ability to display incoming messages and respond to user inputs, e.g., finger taps or swipes. Much of the functionality employed by user devices 110 for these purposes can be implemented using techniques that are well known in connection with conventional Short Message Service (SMS), chat room, and Instant Messaging (IM) applications. In addition to such basic techniques, however, the messaging software on the user devices 110 may incorporate some unique and advantageous enhancements. For example, in some implementations, the user devices 110 can accept audio input in addition to or in lieu of text input, and can thus allow a user to participate in a multi-lingual text message exchange simply by speaking. The user devices 110 may also, in some implementations, have additional functionality that allows a set of available GUI elements to be presented for selection in response to a user's tapping a given message that user wishes to tag, and that transmits information identifying a selected GUI element to the messaging engine 202 when a particular GUI element is selected. The user devices 110 may additionally incorporate novel functionality in some implementations for displaying information concerning selected GUI elements in association with tagged messages so that other users know a given message has been tagged with a particular GUI element, and also selectively enabling additional functionality by a user device 110 in connection with messages that have been so tagged. Such additional functionality may, for example, allow a user to take steps to amend or replace a tagged message, as described above and also further below.

Referring to FIG. 3A, a first user 102a can interact with that user's device 110a (which may be referred to as the first user device), such as by speaking or by manually entering text. When verbal input is provided, the device 110a may perform an analog-to-digital (A/D) conversion 308 to convert the received analog voice audio 304 to digital voice data, and a signal 310 representing the digital voice data may then be transmitted to the server(s) 220 for processing 302a by the ASR engine 204, a natural language understanding (NLU) module 460 (illustrated in FIG. 4), and/or the messaging engine 202.

In some implementations, audio may be received corresponding to a spoken command to send a message, an ASR engine 204 may transcribe the spoken commandand associated message, and an NLU module 460 (shown in FIG. 4) may interpret the command and forward the associated message to the messaging engine 202 for processing. In certain embodiments, in addition to or in lieu of the NLU module 460 recognizing a command to forward a single message, the NLU module 460 may recognize a command to continue transcribing, translating, and exchanging messages via the messaging engine 202, the ASR engine, and the MT engine 206 for some set period of time or until some intervening act or event occurs. For example, in some embodiments, a first utterance, e.g., "Alexa, start a group chat with Rosa and John" can be spoken by the user of the device 110a, transcribed by an ASR engine 204, and interpreted by an NLU module 460 as a command to begin a group chat session among devices 110a, 110b, and 110c, and a second utterance, e.g., "Alexa, stop group chat," can subsequently be spoken, transcribed, and interpreted as a command to stop the group chat session. While a group chat session is ongoing, the messaging engine 202, ASR engine 204, and MT engine 206 may operate, for example, substantially as described in connection with FIGS. 3A-3B. For example, in some implementations, during an ongoing chat session, the messaging engine 202 may continuously receive voice data from devices 110, and transmit messages to the ASR engine 204 requesting voice-to-text conversion, as described above.

In other embodiments, group chat sessions can be initiated by other means, such as by an application being launched on a user device 110 and the user device 110 sending one or more commands to initiate the session to a messaging engine 202 on one or more servers 220. The transmitted command(s) may also identify other users 102 and/or devices 110 that are invited to participate in the session. The messaging engine 202 may then coordinate set up of the chat session with the identified users 102 and/or device 110. A more detailed description of examples of processing that may be performed by ASR engine 204, NLU module 460, and/or a messaging engine 202 is provided below in connection with FIG. 4.

In the example shown, the messaging engine 202 receives and processes 302b text messages resulting from the ASR processing 304, as well as any manually input text that is transmitted 314 by the device 110a via a communication message 312. The text in the language of the user 102a resulting from the ASR conversion 304 may then be transmitted in a communication message 314 to the device 110a, where it can be displayed 316 as an "outgoing" text message. Although not shown in FIGS. 3A-B, it should be appreciated that in some embodiments the system may additionally or alternatively allow users to interact with devices 110 in other ways, such as by making sign-language or other gestures, or causing a video camera to image items. As such, the text in the language of the user 102a may, in some implementations, additionally or alternatively be generated by analysis of a video signal, e.g., to recognize sign language or other gestures, recognize objects, or recognized text on a street sign or object, etc.

The resulting text in the language of user 102a may also be provided to the MT engine 206 for translation 306a into another language. As noted above, in some implementations, the messaging engine 202 may transmit a message to the MT engine 206 requesting conversion of the text in the communication message 314 to a different language, and the MT engine 206 may, in turn, return corresponding text in the other language. A more detailed description of examples of processing that may be performed by the MT engine 206 is provided below.

As shown, the messaging engine 202 may receive and process 302c the translated text in the language of the user 102b, and transmit a communication message 318 containing the translated text to the second user device 110b, where it can be displayed 320 on the device 110b as an "incoming" text message. Upon reviewing the text of the incoming communication message 318, the user 102b may want to provide some sort of feedback to the user 102a who originated the communication message 318. The user 102b might, for example, find the text of the communication message 318 confusing in the context of the conversation currently taking place and wish to communicate such confusion to the user 102a. In response to the user 102b selecting (e.g., tapping) on the displayed text of the communication message 318, the device 110b may display 324 a set of one or more selectable GUI elements, e.g., emojis, that enable the user 102b to provide corresponding types of feedback to the user 102a. The selectable GUI elements can be pre-defined and stored on each device 110a, 110b, so they are immediately available for selection in response to received messages, or they can be requested from server(s) 220 whenever an incoming message is selected (e.g., tapped). FIG. 3 illustrates the former circumstance. Examples of such selectable GUI elements 106a-c are shown in FIG. 1C, discussed above.

After the available GUI elements 106 are displayed 324 by the device 110b, the user 102b is able to select (e.g., tap on) 326 one of the elements to provide a corresponding type of feedback to the user 102a. As shown, in addition to the device 110b displaying 328 the selected GUI element along with the text of the communication message 318 (indicating the communication message 318 has been tagged), a signal 330 identifying the selected GUI element is passed along to the server(s) 220 for processing 302d (e.g., by the messaging engine 202) to generate a signal 332 containing data corresponding to the selected GUI element. The processing 302d responsive to the signal 330 is illustrated in FIG. 3B. The signal 332 is then distributed to the device 110a and perhaps also to other devices 110 participating in the discussion at hand.

As shown in FIG. 3B, Upon receiving the signal 332 containing the GUI-specific data from the server(s) 220, the device 110a displays 334 the selected GUI element 106 along with the text of the communication message 314. An example of how the communication message 314 can be tagged with a GUI element in this fashion is illustrated in FIG. 1D (discussed above), in which the message 104a is shown as having been tagged with the GUI element 106a. At this point, the outgoing communication message 314 that had previously been sent by the user 102a has been tagged with a GUI element 106, indicating to the user 102a that additional functionality relating to the message 314 has been enabled (e.g., functionality relating to available responses to the tag).

Referring still to FIG. 3B, upon the user 102a selecting (e.g., tapping) 336 the tagged communication message 314 and/or the GUI element 106 used to tag the communication message 314, the device 110a can display 338 one or more menu categories from which the user 102a can select to obtain a list of one or more available response options from the server(s) 220. Illustrative examples of possible menu categories of this sort are shown in FIG. 1E (discussed above). As noted above in connection with FIG. 1E, in addition to being presented with one or more menu options, e.g., "I said something else" and/or "I meant something else," the user 102a can also be presented with a block 108 identifying the user who generated the tag for the message and at least some information that provides context for the tag, e.g., a back-translation of the version 104b of the tagged message that was presented to the user 102b.

When the user 102a selects 340 an available menu category, e.g., "I said something else," the device 110a may transmit a signal 342 to the server(s) 220 requesting a list of available options for responding to the tag. In the example shown, the messaging service 202 running on the server(s) 220 is responsible for identifying 302e the available response options. For example, in some implementations, the messaging service 302 may receive N-best lists from the ASR engine 204 and the MT engine 206 in connection with the ASR process 304 performed on the voice data in the signal 310 and the translation process 306a performed on the text in the communication message 314, respectively. When, for example, the user 102a selects 340 the "I said something else" menu category, the process 302e may identify the N-best ASR results for the voice data in the signal 310 and return a signal 344 identifying those results to the device 110a. Similarly, when the user 102a selects 340 the "I meant something else" menu category, the process 302e may identify the N-best MT results for the text of the communication message 314 and return a signal 344 identifying back-translations of those results to the device 110a. In either case, upon receiving a list of available response options, the device 110a may display 346 some or all those options to the user 102a. Examples of lists of available response options of this type are shown in FIG. 1E (discussed above).

In some implementations, the server(s) 220 may store user and or device profile information that determines certain actions the server(s) will take for a particular user 102 and/or device 110. For example, the stored profile information may determine the language into which a message should be translated by the MT engine 206 before being communicated to a device 110. Additionally or alternatively, the profile information may determine the type or types of response options that should be communicated to a device 110 that detects selection of a GUI element 106 and/or the manner in which such options should be presented or made available to a user of that device.

Upon the user 102a selecting 348 (e.g., tapping on) one of the available response options, a signal 350 containing or identifying the selected response option may be transmitted to the server(s) 220. The messaging service 202 may then process 302f the selected response option. When the selected response option indicates a change to the text of outgoing communication message 314 on device 110a, the process 302f may transmit a communication message 352 containing an amended or replacement version of the text to the device 110a, which can then display 354 that amended or replacement version of the text to the user 102a. As shown, the process 302f may also request another translation 306b for the selected response option, and may then transmit a communication message 356 containing an amended or replacement version of the text of the communication message 318 to the device 110b, which can then display 358 that amended or replacement version of the text to the user 102b. As illustrated in FIG. 1F, in some implementations, the amended or replacement messages displayed on either or both of the devices 110a, 110b can be presented in such a way that the respective users 102 are able to readily discern any changes that have been made to the messages they sent and/or received. Such changes can be illustrated, for example, using underlining, stricken-through text, color coding, etc.

In view of the above example, it should be apparent that, in some implementations, the device 110a can (a) present content of a message, (b) receive a first signal corresponding to a response to the message, (c) present an indication of the response to the message, (d) receive information identifying at least one selectable response to the indication, the at least one selectable response having been determined based on the content of the message, (e) present the at least one selectable response to the indication, and (f) take an action in response to detecting selection of the at least one selectable response to the indication. It should likewise be apparent that, in some implementations, the one or more servers 220 can (a) receive a first signal from the device 110b, the first signal identifying a reaction to a first version of a message presented by the device 110b, (b) send a second signal to the device 110a, the second signal instructing the device 110a to present an indication of the reaction in association with a second version of the message presented by the device 110a, (c) determine, based on content of the message, at least one selectable response to the indication, (d) send information identifying the least one selectable response to the device 110a, and (e) receive a third signal from the device 110a, the third signal indicating selection of the at least one selectable response.

In some implementations, user selections of alternative ones of the N-best ASR results (or other corrective actions taken by users 102) in response to message tags 106 may be used to train the ASR engine 204 by appropriately adjusting one or more acoustic models and/or language models the ASR engine 204 employs, which models are discussed in more detail below in connection with FIG. 4. Similarly, in some implementations, user selections of alternative ones of back-translations of the N-best MT results (or other corrective actions taken by users) in response to message tags 106 may be used to train the MT engine 206 by appropriately adjusting one or more translation models, language models, and/or model weights the MT engine 206 employs, which items are discussed in more detail below in connection with FIGS. 5-9.

Figure 4:
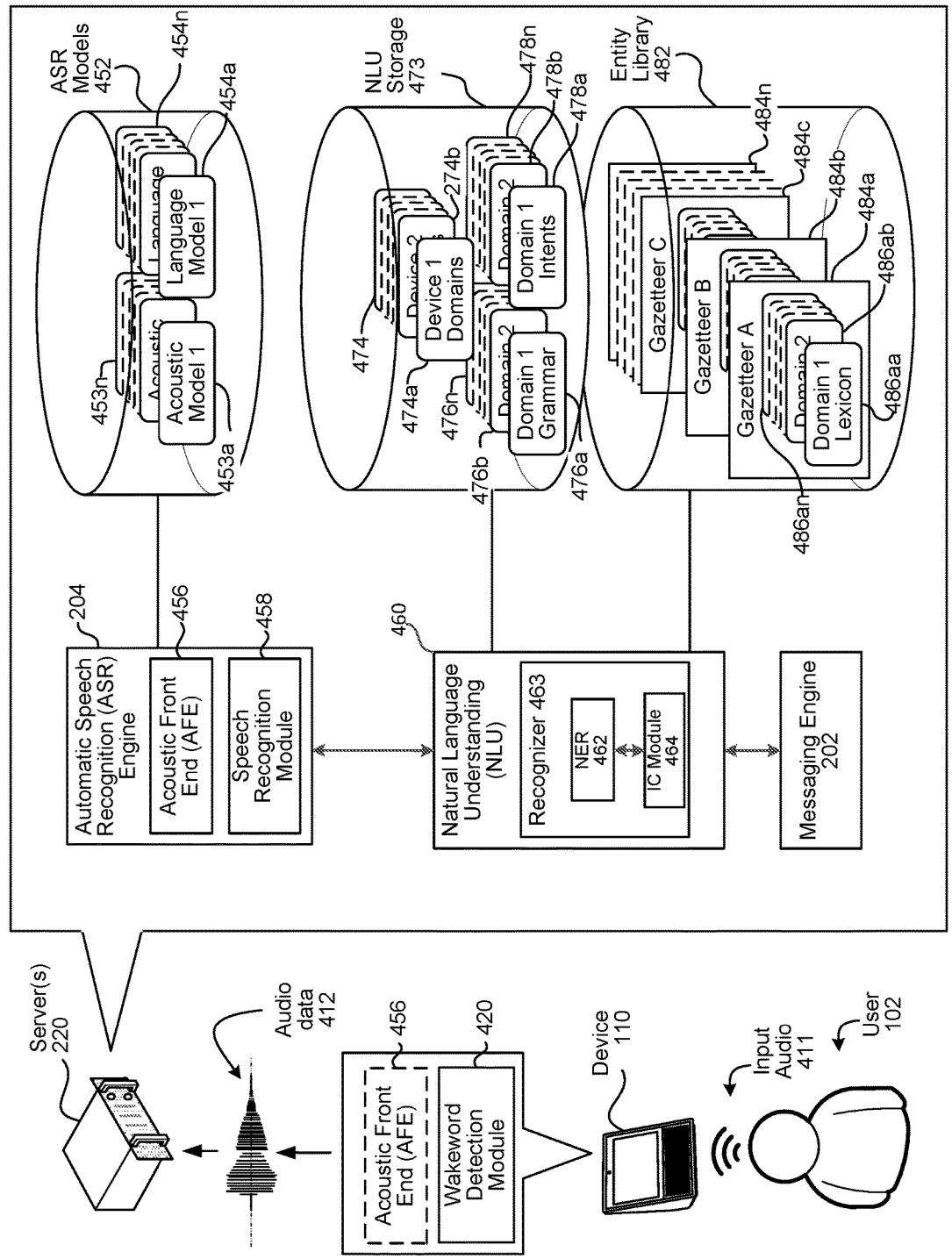
FIG. 4 is a block diagram illustrating components of an automatic speech recognition (ASR) engine that may be employed with some embodiments of the present disclosure.

FIG. 4 is a conceptual diagram illustrating how a spoken utterance may be processed by an ASR engine 204, a message engine 202, and in some implementations an NLU module 460. The various components illustrated may be located on the same or different physical devices. Communication between various components illustrated in FIG. 4 may occur directly or across a network 212. An audio capture component, such as the microphone 208 of a computing device 110, captures input audio 411 corresponding to a spoken utterance. Input audio 411 may, for example, correspond to the voice input 304 shown in FIG. 3.

The device 110, using a wakeword detection module 420, may then processes the audio, or audio data corresponding to the audio, to determine if a keyword (such as a wakeword) is detected in the audio. Following detection of a wakeword, the device may send audio data 412 corresponding to the utterance, to a server 220 that includes an ASR engine 204. The audio data 412 may be output from an acoustic front end (AFE) 456 located on the device 110 prior to transmission. Or the audio data 412 may be in a different form for processing by a remote AFE 456, such as the AFE 456 located with the ASR engine 204.

The wakeword detection module 420 may work in conjunction with other components of the device 110, for example a microphone (not illustrated in FIG. 4) to detect keywords in audio 411. For example, the device 110 may convert audio 411 into audio data 412, and process the audio data 412 with the wakeword detection module 420 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM) or Gaussian Mixture Model (GMM) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 420 to perform wakeword detection to determine when a user intends to provide speech input to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 420 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting builds HMMs for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating a hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 412 corresponding to input audio 411 to the server(s) 220 for speech processing by the ASR engine 204. Audio data corresponding to that audio may be sent to the messaging engine 202 for routing to an ASR engine or may be sent directly to the ASR engine for speech processing for interpretation of the included speech. The audio data 412 may include data corresponding to the wakeword, or the portion of the audio data corresponding to the wakeword may be removed by the local device 110 prior to sending.

In some implementations, once a wakeword is detected, the local device 110 may continue transmitting audio data 412 corresponding to input audio 411 for a specified period of time, or until some intervening act or event is detected or occurs. This may, for example, allow a user to participate in an ongoing chat session with other users, without having to inteject a wakeword prior to making each statement during the conversations. Further, it should be appreciated that wakewords need not be employed in all implementations, and other mechanisms can alternatively be used to indicate or instruct to a system that audio data is to be transmitted to a messaging engine 202 and/or an ASR engine 204 for purposes of engaging in a message-exchange session. In some implementations, for instance, one or more soft keys or physical buttons on a user device 110 may be tapped, pressed, otherwise selected to indicate when to start and/or stop sending audio data the messaging engine 202 and/or the ASR engine 204.

Upon receipt by the server(s) 220, a messaging engine 202 may, for example, pass the audio data to an ASR engine 204, and the ASR engine 204 may then transcribe the audio data 412 into text data representing words of speech contained in the input audio 411. The text data may then be used by other components for various purposes. A spoken utterance in the audio data 412 may be input to a processor configured to perform ASR, which may then interpret the spoken utterance based on a similarity between the spoken utterance and pre-established language models 454 stored in an ASR model knowledge base (e.g., ASR model storage 452). For example, the ASR engine 204 may compare the audio data 412 with models for sounds (e.g., subword units or phonemes) and sequences of sounds to identify words that match the sequence of sounds spoken in the spoken utterance of the audio data 412.

The different ways a spoken utterance may be interpreted (i.e., the different hypotheses) may each be assigned a probability or a confidence score representing a likelihood that a particular set of words matches those spoken in the spoken utterance. The confidence score may be based on a number of factors including, for example, a similarity of the sound in the spoken utterance to models for language sounds (e.g., an acoustic model 453 stored in the ASR model storage 452), and a likelihood that a particular word that matches the sound would be included in the sentence at the specific location (e.g., using a language model 454 stored in the ASR model storage 452). Thus, each potential textual interpretation of the spoken utterance (i.e., hypothesis) is associated with a confidence score. Based on the considered factors and the assigned confidence score, the ASR engine 204 outputs the most likely text recognized in the audio data 412. The ASR engine 204 may also output multiple hypotheses in the form of a lattice or an N-best list with each hypothesis corresponding to a confidence score or other score (e.g., such as probability scores, etc.).

The device or devices included in the ASR engine 204 may include an AFE 456 and a speech recognition module 458. The AFE 456 transforms the audio data 412, captured by the microphone (not illustrated in FIG. 4), into data for processing by the speech recognition engine 458. The speech recognition module 458 compares the speech recognition data with acoustic models 453, language models 454, and other data models and information for recognizing the speech conveyed in the audio data 412. The AFE 456 may reduce noise in the audio data 412 and divide the digitized audio data 412 into frames representing time intervals for which the AFE 456 determines a number of values (i.e., features) representing qualities of the audio data 412, along with a set of those values (i.e., a feature vector or audio feature vector) representing features/qualities of the audio data 412 within each frame. Many different features may be determined, as known in the art, and each feature represents some quality of the audio that may be useful for ASR processing. A number of approaches may be used by the AFE 456 to process the audio data 412, such as melfrequency cepstral coefficients (MFCCs), perceptual linear predictive (PLP) techniques, neural network feature vector techniques, linear discriminant analysis, semi-tied covariance matrices, or other approaches known to those skilled in the art.

The speech recognition module 458 may process data output from the AFE 456 with reference to information stored in the ASR model storage 452. Alternatively, post front-end processed data (e.g., feature vectors) may be received by the device executing ASR processing from another source besides the internal AFE 456. For example, the computing device 110 may process audio data 412 into feature vectors (e.g., using an on-device AFE 456) and transmit that information to the server(s) 220 across the network 212 for ASR processing. Feature vectors may arrive at the server(s) 220 encoded, in which case they may be decoded prior to processing by the processor executing the speech recognition module 458.

The speech recognition module 458 may attempt to match received feature vectors to language phonemes and words as known in the stored acoustic models 453 and language models 454. The speech recognition module 458 may compute recognition scores for the feature vectors based on acoustic information and language information. The acoustic information may be used to calculate an acoustic score representing a likelihood that the intended sound represented by a group of feature vectors matches a language phoneme. The language information may be used to adjust the acoustic score by considering what sounds and/or words are used in context with each other, thereby improving a likelihood that the ASR engine 204 will output speech results that make sense grammatically.

The speech recognition module 458 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound.

Following ASR processing, the ASR results may be sent by the speech recognition module 458 to other processing components, which may be local to the device performing ASR and/or distributed across the network(s) 212. For example, ASR results in the form of a single textual representation of the speech, an N-best list including multiple hypotheses and respective scores, lattice, etc., may be sent to the messaging engine 202 discussed above, which may be located on the same or a different server than the ASR engine 204.

Additionally or alternatively, ASR results in the form of a single textual representation of the speech, an N-best list including multiple hypotheses and respective scores, lattice, etc. may be sent to natural language understanding (NLU) module for processing, such as conversion of the text data into commands for execution, either by a speech-controlled device 110, by the messaging engine 202 or another module on the server(s) 220, or by another device (e.g., a server running a search engine, etc.)

The device performing NLU processing 460 (e.g., a server 220) may include various components, including potentially dedicated processor(s), memory, storage, etc. As shown in FIG. 4, an NLU component may include a recognizer 463 that includes a named entity recognition (NER) module 462 which is used to identify portions of query text that correspond to a named entity that may be recognizable by the system. A downstream process called named entity resolution actually links a text portion to an actual specific entity known to the system. To perform named entity resolution, the system may utilize gazetteer information (484a-484n) stored in entity library storage 482. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways. The NER module 462 (or other component) may also determine whether a word refers to an entity that is not explicitly mentioned in the utterance text, for example "him," "her," "it" or other anaphora, exophora or the like.

Generally, the NLU process takes textual input (such as processed from ASR engine 204 based on the utterance input audio 411) and attempts to make a semantic interpretation of the text. That is, the NLU process determines the meaning behind the text based on the individual words and then implements that meaning. NLU module 460 interprets a text string to derive an intent or a desired action from the user as well as the pertinent pieces of information in the text that allow a device (e.g., device 110) to complete that action. For example, if a spoken utterance is processed using ASR engine 204 and outputs the text "call mom" the NLU process may determine that the user intended to activate a telephone in his/her device and to initiate a call with a contact matching the entity "mom" (which may involve a downstream command processor 490 linked with a telephone application).

The NLU may process several textual inputs related to the same utterance. For example, if the ASR engine 204 outputs N text segments (as part of an N-best list), the NLU may process all N outputs to obtain NLU results.

As will be discussed further below, the NLU process may be configured to parsed and tagged to annotate text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Further, the NLU process may be used to provide answer data in response to queries, for example using the knowledge base 472.

To correctly perform NLU processing of speech input, an NLU module 460 may be configured to determine a "domain" of the utterance so as to determine and narrow down which services offered by the endpoint device (e.g., server 220 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The named entity recognition (NER) module 462 receives a query in the form of ASR results and attempts to identify relevant grammars and lexical information that may be used to construe meaning. To do so, the NLU module 460 may begin by identifying potential domains that may relate to the received query. The NLU storage 473 includes a databases of devices (474a-474n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, Speaker ID, or Household ID, or some other indicator.

In NLU processing, a domain may represent a discrete set of activities having a common theme, such as "shopping", "music", "calendaring", etc. As such, each domain may be associated with a particular recognizer 463, language model and/or grammar database (476a-476n), a particular set of intents/actions (478a-478n), and a particular personalized lexicon (486). Each gazetteer (484a-484n) may include domain-indexed lexical information associated with a particular user and/or device. For example, the Gazetteer A (484a) includes domain-index lexical information 486aa to 486an. A user's music-domain lexical information might include album titles, artist names, and song names, for example, whereas a user's contact-list lexical information might include the names of contacts. Since every user's music collection and contact list is presumably different, this personalized information improves entity resolution.

As noted above, in traditional NLU processing, a query may be processed applying the rules, models, and information applicable to each identified domain. For example, if a query potentially implicates both communications and music, the query may, substantially in parallel, be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 464 parses the query to determine an intent or intents for each identified domain, where the intent corresponds to the action to be performed that is responsive to the query. Each domain is associated with a database (478a-478n) of words linked to intents. For example, a music intent database may link words and phrases such as "quiet," "volume off," and "mute" to a "mute" intent. The IC module 464 identifies potential intents for each identified domain by comparing words in the query to the words and phrases in the intents database 478. Traditionally, the determination of an intent by the IC module is performed using a set of rules or templates that are processed against the incoming text to identify a matching intent.

In order to generate a particular interpreted response, the NER 462 applies the grammar models and lexical information associated with the respective domain to actually recognize a mention one or more entities in the text of the query. In this manner the NER 462 identifies "slots" (i.e., particular words in query text) that may be needed for later command processing. Depending on the complexity of the NER 462, it may also label each slot with a type of varying levels of specificity (such as noun, place, city, artist name, song name, or the like). Each grammar model 476 includes the names of entities (i.e., nouns) commonly found in speech about the particular domain (i.e., generic terms), whereas the lexical information 486 from the gazetteer 484 is personalized to the user(s) and/or the device. For instance, a grammar model associated with the shopping domain may include a database of words commonly used when people discuss shopping.

The intents identified by the IC module 464 are linked to domain-specific grammar frameworks (included in 476) with "slots" or "fields" to be filled. Each slot/field corresponds to a portion of the query text that the system believes corresponds to an entity. For example, if "play music" is an identified intent, a grammar (476) framework or frameworks may correspond to sentence structures such as "Play {Artist Name}," "Play {Album Name}," "Play {Song name}," "Play {Song name} by {Artist Name}," etc. However, to make resolution more flexible, these frameworks would ordinarily not be structured as sentences, but rather based on associating slots with grammatical tags.

For example, the NER module 462 may parse the query to identify words as subject, object, verb, preposition, etc., based on grammar rules and/or models, prior to recognizing named entities. The identified verb may be used by the IC module 464 to identify intent, which is then used by the NER module 462 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 462 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 464 will determine corresponds to the "play music" intent. At this stage, no determination has been made as to the meaning of "mother's little helper" and "the rolling stones," but based on grammar rules and models, it is determined that the text of these phrases relate to the grammatical object (i.e., entity) of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 462 may search the database of generic words associated with the domain (in the knowledge base 472). So for instance, if the query was "play songs by the rolling stones," after failing to determine an album name or song name called "songs" by "the rolling stones," the NER component 462 may search the domain vocabulary for the word "songs." In the alternative, generic words may be checked before the gazetteer information, or both may be tried, potentially producing two different results.

The results of NLU processing may be tagged to attribute meaning to the query. So, for instance, "play mother's little helper by the rolling stones" might produce a result of: {domain} Music, {intent} Play Music, {artist name}"rolling stones," {media type} SONG, and {song title} "mother's little helper." As another example, "play songs by the rolling stones" might produce: {domain} Music, {intent} Play Music, {artist name}"rolling stones," and {media type} SONG.

When the NLU module 460 indicates a text message is to be sent, the output data from the NLU processing (which may include tagged text, commands, etc.) may be sent to the messaging engine 202 for processing. In some implementations, the system may include command processors in addition to the messaging engine 202, and the destination command processor may be determined based on the NLU output. For example, if the NLU output includes a command to play music, the destination command processor may be a music playing application, such as one located on device 110 or in a music playing appliance, configured to execute a music playing command. If the NLU output includes a search utterance (e.g., requesting the return of search results), the command processor selected may include a search engine processor, such as one located on a search server, configured to execute a search command and determine search results, which may include output text data to be processed by a text-to-speech engine and output from a device as synthesized speech.

If the NLU output includes a command to obtain content from another source, the command processor or other component, through an application program interface (API), may send a request for such content to an appropriate application server or other device. The application server may send the content, for example audio content, to the command processor or other component. In certain instances, the output content sent from the application server may include a link that may be sent from the server(s) 220 to the local device 110 closest to the user (e.g., first device 110a) so that the first device 110a may use the link to access the output content desired by the user. In this case the output content data may be sent from the application server through the server(s) 220 to the first device 110a or directly from the application server to the first device 110a (or some other destination appropriate to the command). In certain instances the output content data may be audio data (such as music, a prerecorded reading of an audio book, etc.) and thus may be output through a speaker of the local device 110. In other instances the output content data may be text data (either generated by the application server or by a component of the server(s) 220) that needs to be converted into audio data prior to being output to a user using the local device 110.

Figure 5:
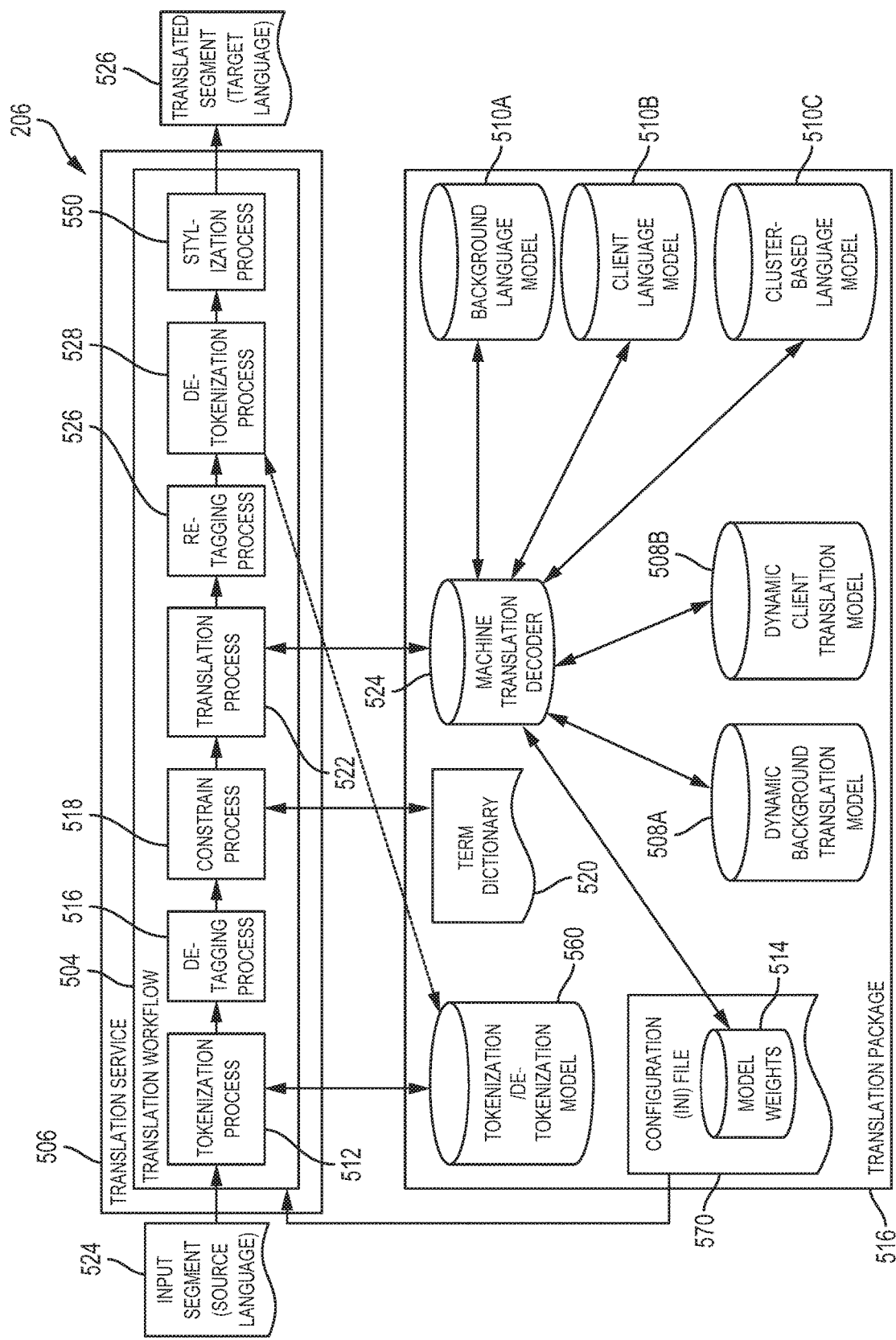
FIG. 5 is a block diagram illustrating components of a machine translation (MT) engine that may be employed with some embodiments of the present disclosure.

FIG. 5 is a system architecture diagram showing aspects of a machine translation (MT) engine 206 that can be used to translate input segments 524 of text, e.g., the text of communication message 314 of FIG. 3, into output segments 526 of text, e.g., the text of communication message 318 of FIG. 3, using translation models 508 and language models 510, according to one configuration disclosed herein. As shown, the MT engine 206 may include a translation service 306 and a translation package 516. The translation package 516 may include a background language model 510A, a client language model 510B, and a cluster-based language model 510C. A combined language model (not shown in FIG. 5) can additionally or alternatively be utilized in some configurations.

The translation package 516 may also include a dynamic background translation model 508A and a dynamic client translation model 508B. A combined translation model (not shown in FIG. 5) can additionally or alternatively be utilized in some configurations. The translation package 516 can further include a configuration file 570 that includes model weights 514. The configuration file 570 might also specify other preferences regarding the manner in which translations are to be performed.

In some configurations, the translation package 516 also includes a tokenization/de-tokenization model 560. The tokenization/de-tokenization model 560 can be generated by a tokenization process and utilized at translation time to tokenize and/or de-tokenize an input segment 524 that is to be translated. The translation package 516 can also include a term dictionary 520 that includes translations for client-specific words or phrases. The term dictionary 520 can be utilized to ensure that specified words or phrases are translated in the same manner regardless of the context within which they appear.

The illustrated translation package 516 also includes a machine translation decoder 524. In one particular configuration, the machine translation decoder 524 is the MOSES open-source statistical machine translation system. Other statistical machine translation decoders can be utilized in other configurations. The configuration file 570 can include data for configuring the machine translation decoder 524 in various ways. Additional details regarding the MOSES open-source statistical machine translation system can be found at http://www.statmt.org/moses/.

As shown in FIG. 5 and described briefly above, the translation service 506 can utilize the translation package 516 when translating an input segment 524 in a source language to a translated segment 526 in a target language. In particular, the translation service 506 is configured in some implementations to implement a translation workflow 504 in order to perform the translation. The configuration file 570 can include data that specifies various aspects regarding the operation of the translation workflow 504.

As shown, the translation workflow 504 begins with the tokenization process 512. The tokenization process 512 tokenizes the input segment 524 by breaking the text into discrete units. For example, and without limitation, the tokenization process 512 can separate punctuation characters, perform normalization on the text, and break apart contractions.

The tokenization process 512 provides the tokenized input segment 524 to the de-tagging process 504. The de-tagging process 504 removes any markup tags (e.g. HTML tags) that appear in the input segment 524. As will be described in greater detail below, the removed markup tags can be added to the translated segment 526 by the re-tagging process 526. In this manner, formatting contained in the input segment 524 can be preserved in the translated segment 526.

The tokenized and de-tagged input segment 524 is provided to the constrain process 518 in one configuration. The constrain process 518 utilizes the term dictionary 520 to translate specified words or phrases identified in the term dictionary 520. As mentioned above, this enables a specific translation of a word or phrase to be performed regardless of the context in which the word or phrase appears. Other types of constraints can also be utilized in other configurations instead of or in addition to the term dictionary 520.

The next step in the translation workflow 504 is the translation process 522. The translation process 522 utilizes the machine translation decoder 524 to translate the input segment 524 into the target language. In this regard, the machine translation decoder 524 can utilize the dynamic background translation model 508A, the dynamic client translation model 508B, and a combined translation model, if present, to dynamically learn a model that can be utilized to translate the input segment 524 specifically to one or more candidate translations of the input segment 524 in the target language.

The translation models 508 can provide various feature scores for the candidate translations. Similarly, the machine translation decoder 524 can utilize the background language model 510A, the client language model 510B, and the cluster-based language model 510C to also generate feature scores for the candidate translations. The model weights 514 can then be utilized to weight the various contributions from the language models 510 and the translation models 508. The weighted feature scores can then be utilized to combine various candidate translations to form a translation of the input segment 524. In some implementations, the weighted feature scores can be used to identify the N-best translations of the input segment along with associated scores, etc.

As mentioned briefly above, the re-tagging process 526 can then be performed to re-apply any formatting removed from the input segment 524 by the de-tagging process 504. Subsequently, the de-tokenization process 528 can utilize the tokenization/de-tokenization model 514 to de-tokenize the translated segment 526. For example, and without limitation, the de-tokenization process 528 can attach punctuation to the translated segment 526 that was separated by the tokenization process 512. As another example, the de-tokenization process 528 can merge contractions that were broken apart by the tokenization process 512. The de-tokenization process 528 can also perform other functionality not specifically mentioned herein.

In one configuration, a stylization process 550 is also performed as a part of the translation workflow 504. The stylization process 550 utilizes pre-defined lists of client-specific rules to stylize the translated segment 526. For example, and without limitation, spaces can be inserted before measurements or a certain type of quotation marks can be utilized for a specific language. Other types of client-specific stylizations that are to be applied to the translated segment 526 can also be defined and utilized in a similar manner.

Once the translation workflow 504 has completed, the translation results can be returned in response to the request to translate the input segment 524 from the source language to the target language. For example, MT results in the form of a single translation of the input segment 524, an N-best list including multiple hypotheses and respective scores, etc., may be sent to the messaging engine 202 discussed above, which may be located on the same or a different server than the MT engine 204.

Figure 6:
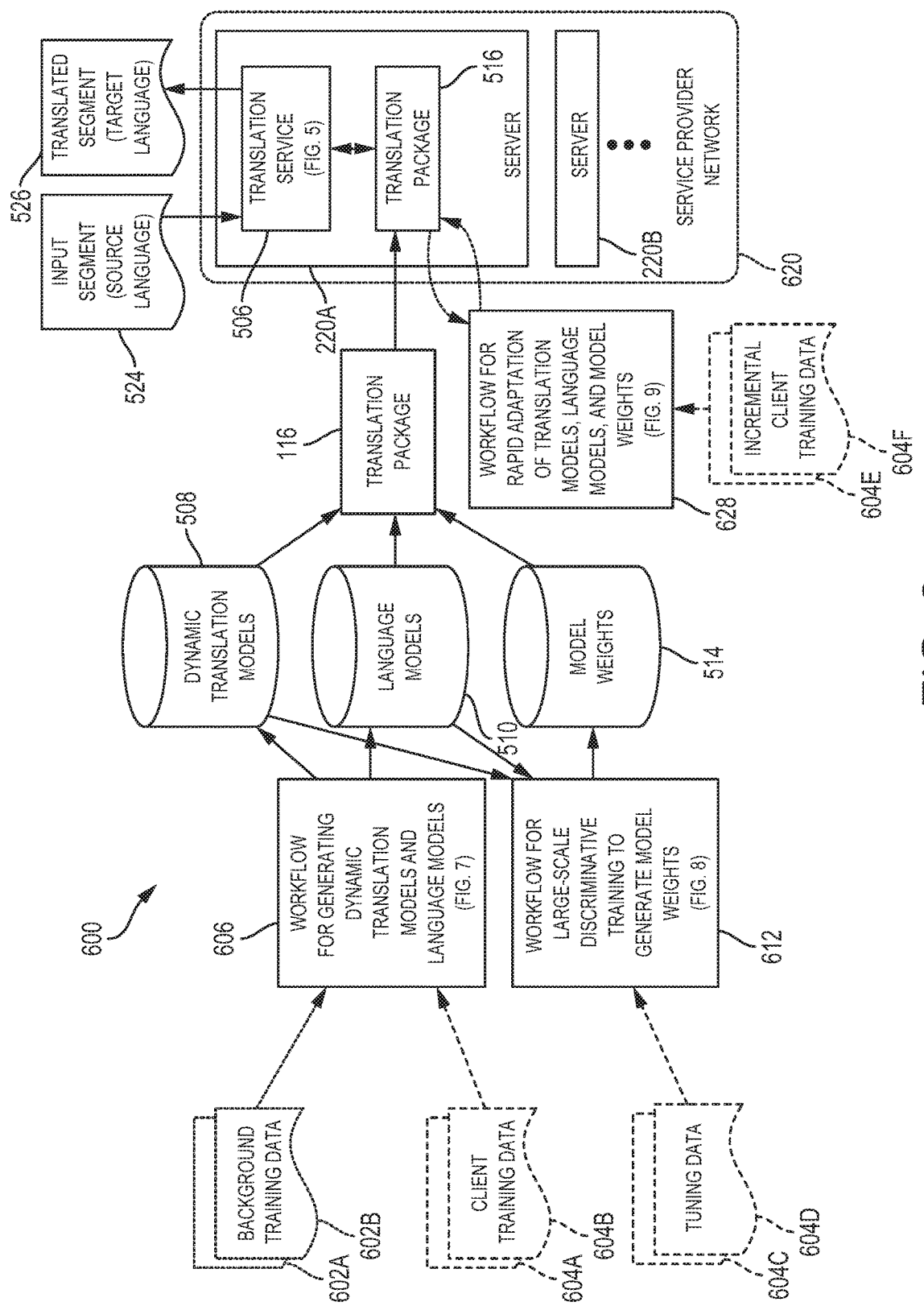
FIG. 6 is a block diagram showing an overview of the configuration and operation of a machine learning system that can be used to generate a translation package used by the MT engine shown in FIG. 5.

FIG. 6 is a system architecture diagram showing an overview of the configuration and operation of a machine learning system 600 that is configured with rapid adaptation capabilities. The system of FIG. 6 can be utilized to create the translation package 516 that can be utilized by the translation service 506 of the MT engine 206 to translate an input segment 524, or segments, expressed in a source language (e.g. English) to a translated segment 526, or segments, in a target language (e.g. Spanish).

In order to generate the translation package 516, a workflow 606 is performed for generating dynamic translation models 508 for the source and target languages, and for generating language models 510 for the target language. The workflow 606 takes non-domain-specific background training data 602 as input. The background training data 602A, for example, may be a collection of sentences or paragraphs expressed in the source language, and the background training data 602B may be the same collection of sentences or paragraphs that have been expressed in the target language.

In a similar fashion, the workflow 606 also takes as input in-domain client training data 604. As with the background training data 602, the client training data 604A may be a collection of sentences or paragraphs expressed in the source language, and the client training data 604B may be the same collection of sentences or paragraphs that have been expressed in the target language. In one specific implementation, the non-domain-specific background training data 602 is translations of books and the in-domain client training data 604 are product descriptions for products offered through an e-commerce merchant. Other types of in-domain and out-of-domain training data can be utilized in other configurations.

As shown in FIG. 6, the output of the workflow 606 is one or more dynamic translation models 508 for translating between the source and target languages, and one or more language models 510 for the target language. Additional details regarding the workflow 606 for generating the dynamic translation models 508 and the language models 510 are provided below with regard to FIG. 7.

In order to generate the translation package 516, a workflow 612 is also executed for performing large-scale discriminative training to generate model weights 514 for the dynamic translation models 508 and the language models 510. In one configuration, the margin relaxed infused algorithm ("MIRA") is utilized to perform the large-scale discriminative training. Other algorithms can also be utilized in other configurations.

As illustrated in FIG. 6, the workflow 612 takes additional in-domain client tuning data 604C and 604D as input. The additional in-domain client tuning data 604C and 604D can include sentences, paragraphs, or other phrases in the source and target languages that were not included in the client training data 604A and 604B. Additionally, the additional in-domain client tuning data 604C and 604D may include text of a type that is similar to the input segments 524 that will be encountered during production use of the machine translation system 600. Additional details regarding the generation of the model weights 514 will be provided below with regard to FIG. 8.

Once the model weights 514 have been generated, the dynamic translation models 508, the language models 510, and the model weights 514 are added to the translation package 516. The translation package 516 can then be deployed to one or more servers 220 in a service provider network 620 and utilized as an MT engine 202 to perform translations 306, as discussed above in connection with FIGS. 2 and 3. The service provider network 620 may, for example, be a computing network configured to provide computing resources on a permanent or an as-needed basis. Among other types of functionality, the computing resources provided by the service provider network 620 can be utilized to implement various network services described herein, such as the translation service 506 used to perform translations. The computing resources provided by the service provider network 620 can include various types of computing resources, such as data processing resources like virtual machine ("VM") instances, data storage resources, networking resources, data communication resources, network services, and the like.

As discussed briefly above, the service provider network 620 can be configured to execute various types of network services. For example, and without limitation, the service provider network 620 can execute the ASR engine 204 shown in FIG. 4 and the MT engine 206 shown in FIG. 5. As discussed briefly above, the translation service 506 is a network service that executes in the service provider network 620 in one particular configuration. The translation service 506 may, for example, expose an interface, such as a Web services interface, through which callers (e.g., the messaging engine 202) can request translation of an input segment 524 in a source language to a translated segment 526 in a target language. In response to receiving such a request, the translation service 506 is configured to utilize the dynamic translation models 508, the language models 510, and the model weights 514 contained in the translation package 516 to perform the requested translation. Additional details regarding the operation of the translation service 506 are discussed above in connection with FIG. 5.

In one particular configuration, a workflow 628 can also be performed for rapid adaptation of the dynamic translation models 508, the language models 510, and the model weights 514. In order to perform rapid adaption of these components, the workflow 628 takes as input incremental in-domain client training data 604E-604F. For example, translations generated by the statistical machine translation system shown in FIG. 6 might be post-edited by human translators to ensure that they are accurate translations of the associated input segment. The input segments and their corresponding post-edited translations can then be utilized as the incremental client training data 604E-604F for use in rapidly adapting the dynamic translation models 508, the language models 510, and the model weights 514.

In one particular configuration, the machine translated segments 526 can be presented to users of a Web site, such as an e-commerce site. For example, and without limitation, an appropriate UI can be presented to users of an e-commerce site that include machine translated segments 526 of product or service descriptions or related content. The UI can also provide UI controls to query the user as to whether the translation appears correct and, if not, to provide the correct translation. The human post-edited translations can then be utilized as the incremental client training data 604E-604F for use in rapidly adapting the dynamic translation models 508, the language models 510, and the model weights 514 in the manner described above. In this regard, it should be appreciated that other types of UIs can be utilized in other environments for obtaining human post-edited translations for use as the incremental client training data 604.

In some implementations, user corrections of translations performed by MT engine 206, e.g., a user's selection of a back-translation of an alternate N-best MT result, as discussed above and specifically illustrated in FIG. 1F, can be used as the incremental client training data 604 that can be used to rapidly adapt the dynamic translation models 508, the language models 510, and the model weights 514 in the manner described.

The workflow 628 can also generate an updated translation package and deploy the updated translation package to the service provider network 620 in place of a previous version of the translation package 516. Additional details regarding the workflow 628 for performing rapid adaptation of the dynamic translation models 508, the language models 510, and the model weights 514 will be provided below with regard to FIG. 9.

It should be appreciated that the workflows 606 and 612 may be implemented in one particular configuration utilizing the open-source DUCTTAPE workflow management system. Additional software components can then be utilized to encapsulate the resulting language models 510, translation models 508, model weights 514, and other components into a translation package 516, such as a software container, that can be deployed into a production environment, such as the service provider network 620. Once deployed, the translation package 516 can be utilized to respond to translation requests received from service clients.

It should also be appreciated that the various models shown in FIGS. 5 and 6 are merely illustrative and that other models and their associated model weights can be utilized in a similar manner to that described herein. For example, and without limitation, one or more reordering models (not shown in FIGS. 5 and 6) may additionally or alternatively utilized in some configurations. In other configurations, multiple domain-specific models can be utilized. Other configurations can also be utilized without departing from the spirit and scope of the disclosure presented herein.

Figure 7:
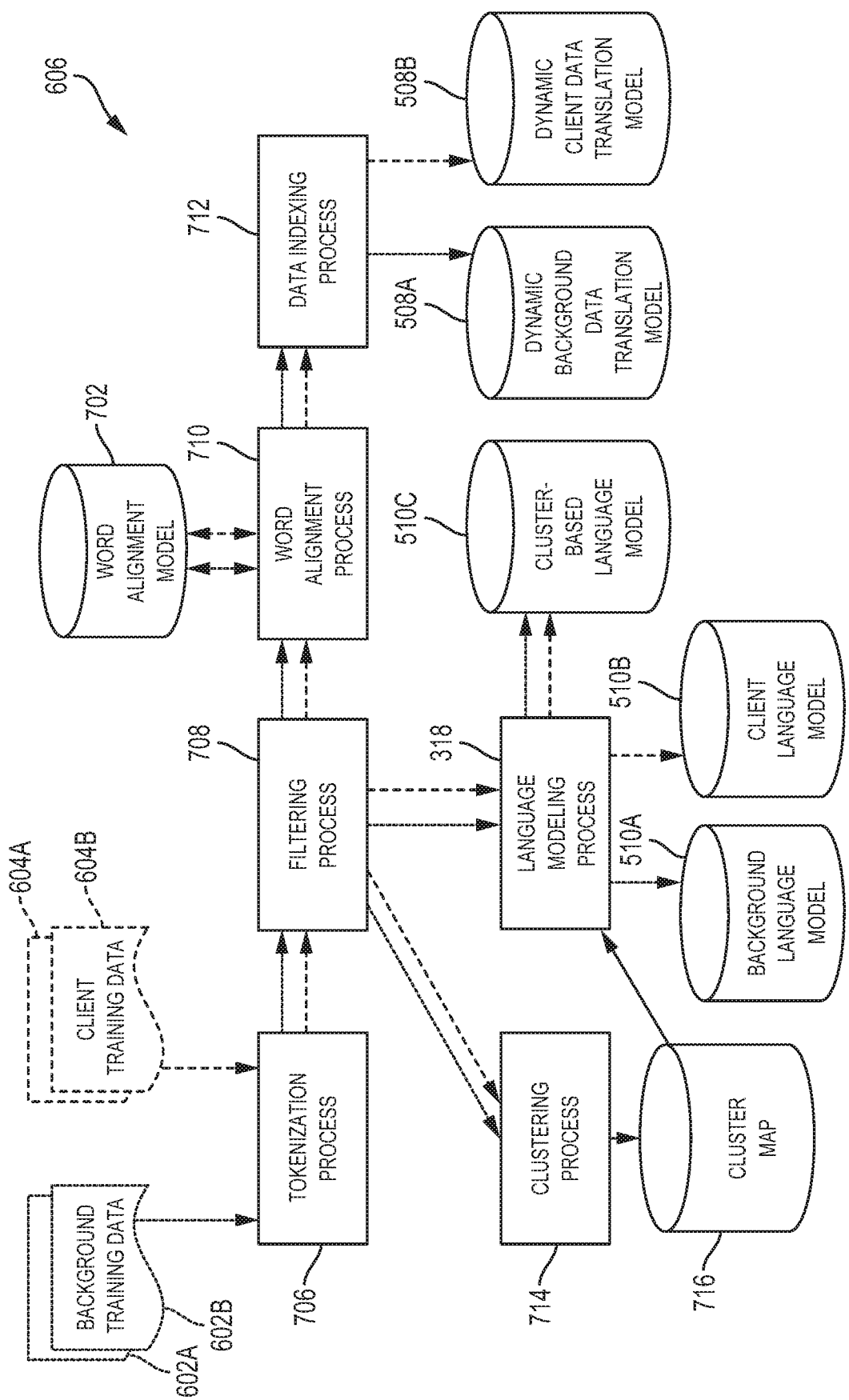
FIG. 7 is a block diagram showing aspects of the operation of the workflow shown in FIG. 6 for generating dynamic translation models and language models.

FIG. 7 is a system architecture diagram showing aspects of the operation of the workflow 606 shown in FIG. 6 for generating dynamic translation models 508 and language models 510, according to one configuration disclosed herein. As discussed briefly above, the workflow 606 takes as input non-domain-specific background training data 602. The background training data 602A, for example, may be a collection of sentences or paragraphs expressed in the source language, and the background training data 602B may be the same collection of sentences or paragraphs that have been expressed in the target language. The background training data 602A and 602B may be referred to herein collectively as "background training data 602."

In a similar fashion, the workflow 606 also takes as input in-domain client training data 604. As with the background training data 602, the client training data 604A may be a collection of sentences or paragraphs expressed in the source language, and the client training data 604B may be the same collection of sentences or paragraphs that have been expressed in the target language. The client training data 604A and 604B may be referred to herein collectively as "client training data 604." The dotted lines in FIG. 7 represent the flow of the background training data 602 while the dashed lines represent the flow of the client training data 604.

The first step of the workflow 606 illustrated in FIG. 7 is the tokenization process 706. The tokenization process 706 tokenizes both the background training data 602 and the client training data 604 by breaking the text into discrete units. For example, and without limitation, the tokenization process 706 can separate punctuation characters, perform normalization on the text, and break apart contractions. The tokenized background training data 602 and client training data 604 is then provided to the filtering process 708.

The filtering process 708 removes text from the tokenized background training data 602 and the client training data 604 that is not suitable for inclusion in the dynamic translation models 508 or for use in training the language models 510. For example, and without limitation, the filtering process 708 might remove very long sentences that are not useful for creating the language models 510. Similarly, the filtering process 708 can remove mismatched sentences that are not appropriate for use in the dynamic translation models 508. Other types of filtering can be performed. The tokenized and filtered background training data 602 and client training data 604 is then provided to the word alignment process 710. The tokenized and filtered background training data 602 and client training data 604 in the target language is also provided to the language modeling process 718 and the clustering process 714. Each of these processes is described in detail below.

The word alignment process 710 utilizes unsupervised machine learning to learn a word alignment model 702 describing word-level correspondences between the training data in the source language and the training data in the target language. For example, and without limitation, the word alignment process 710 can learn word-level correspondences between the out-of-domain background training data 602A in the source language and the background training data 602B in the target language. Similarly, the word alignment process 710 can learn word-level correspondences between the in-domain client training data 604A in the source language and the client training data 604B in the target language. The word alignment model 702 can be saved for use during the rapid retraining process described below with regard to FIG. 9. The tokenized, filtered, and word-aligned background training data 602 and client training data 604 is then provided to the data indexing process 712.

The data indexing process 712 indexes the tokenized, filtered, and word-aligned background training data 602 to create a dynamic background data translation model 508A. The data indexing process 712 also indexes the tokenized, filtered, and word-aligned client training data 604 to create a dynamic client data translation model 508B. In some configurations, a combined translation model (not shown in FIG. 7) is generated using both the background training data 602 and the client training data 604.

The indexed background training data 602 and client training data 604 stored in the dynamic background translation model 508A and the dynamic client data translation model 508B, respectively, can be searched at translation time to generate candidate translations of phrases in an input segment 524. In one particular implementation, the translation models 508 are implemented utilizing suffix array data structures. Other data structures can be utilized in other configurations to index the background training data 602 and the client training data 604 in a manner suitable for efficient searching at run time. As will also be described in greater detail below, incremental background and client training data can be added to the dynamic background translation model 508A and the dynamic client data translation model 508B, respectively, without rebuilding the entire index. Details regarding this process are provided below with regard to FIG. 9.

As discussed briefly above, the tokenized and filtered background training data 602 and client training data 604 in the target language is also provided to the language modeling process 718. The language modeling process 718 utilizes the background training data 602 to generate a background language model 510A for the target language. The language modeling process 718 also utilizes the client training data 604 to generate a client language model 510B for the target language. In some configurations, the language modeling process 718 also generates a combined language model (not shown in FIG. 7) for the target language utilizing both the background training data 602A and the client training data 602B. As will be described in greater detail below, the background language model 510A, the client language model 510B, and the combined language model, if utilized, can generate feature scores for different attributes of the translations generated by the statistical machine translation system described herein.

As also discussed briefly above, the tokenized and filtered background training data 602 and client training data 604 in the target language is also provided to the clustering process 714. The clustering process 714 first creates a cluster map 716 by assigning each word in the target language to a cluster, a group of words that occur in similar contexts. In one particular implementation, for example, the Brown clustering algorithm is utilized to cluster the words in the tokenized and filtered background training data 602 and client training data 604 in the target language. As known to those skilled in the art, Brown clustering is an agglomerative, bottom-up form of clustering that groups words (i.e., types) into a binary tree of classes using a merging criterion based on the log-probability of a text under a class-based language model (i.e. a probability model that takes the clustering into account). Details regarding one particular implementation of the Brown hierarchical word clustering algorithm in the C++ programming language can be found at http://cs.stanford.edu/·pliang/ and https://github.com/percyliang/brown-cluster, both of which are incorporated herein by reference in their entirety.

Using the Brown clustering algorithm, monolingual text can be examined to identify words that tend to be used in the same way and appear in the same context. These words can then be mapped to the same cluster. The words in the background training data 602 and client training data 604 in the target language can then be replaced by unique cluster identifiers ("IDs") for the clusters they have been mapped to.

A language model can then be built over the sequences of cluster IDs, as described in greater detail below.

Once the cluster map 716 has been established, a statistical cluster-based language model 510C is trained by mapping the target-language words in the language model training data to a cluster. As discussed above, the cluster-based language model 510C is then trained on the resulting cluster sequences. In one particular implementation, the cluster-based language model 510C is generated using the open-source KENLM language model generating tool. Additional details regarding the KENLM language model generating tool can be found at https://kheafield.com/code/kenlm/.

It should be appreciated that other language model generation tools or toolkits can be utilized in other configurations. In this regard, it should also be appreciated that while a single cluster-based language model 510C is shown in FIG. 7, multiple cluster-based language models can be utilized in other configurations. For example, separate cluster-based language models can be generated utilizing the background training data in the target language and the client training data in the target language. Other configurations can also be utilized. In this regard, it should also be appreciated that the open-source KENLM language model generating tool can also be utilized to generate the other language models described herein. Other language model generating tools and toolkits can also be utilized in other configurations.

As will be described in greater detail below, a run time capability for mapping lexical tokens to their appropriate word clusters in real time during decoding is also provided. This abstraction permits language models to recognize and statistically model much longer spans of text than previously possible, effectively modeling natural language patterns rather than just "raw" sentences in the language. In practice, this capability nearly doubles the context length that the disclosed statistical machine translation system can reliably use as a source of language model information. In this regard, it should be appreciated that the cluster-based language model 510C can be utilized in addition to the standard lexical-level language models 510A and 510B. Other configurations can also be utilized.

Figure 8:
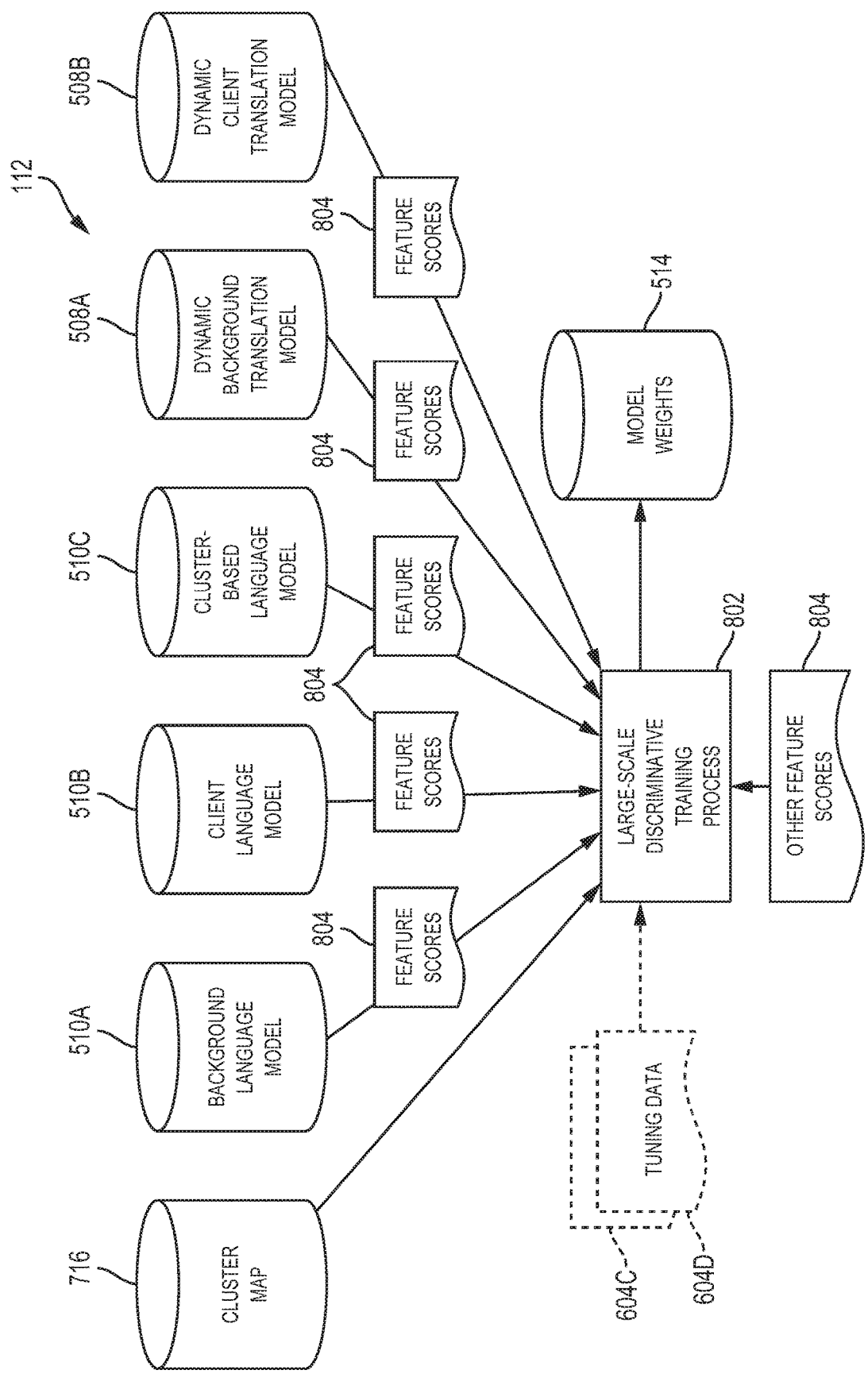
FIG. 8 is a block diagram showing aspects of the operation of the workflow shown in FIG. 6 for using large-scale discriminative training to generate model weights.

FIG. 8 is a system architecture diagram showing aspects of the operation of the workflow 612 shown in FIG. 6 for using large-scale discriminative training to generate model weights 514, according to one configuration disclosed herein. As discussed briefly above, the background language model 510A, the client language model 510B, the cluster-based language model 510C, the dynamic background translation model 508A, and the dynamic client translation model 508B can generate feature scores 804 for candidate translations of phrases in the input segments 524 at translation time. As discussed above, the feature scores 804 indicate how likely a translation is based upon the data that the model utilized to perform the translation was trained upon. Each of the various language and translation models can generate multiple feature scores. Additionally, the feature scores 804 can also include other statistical measures generated by the statistical machine translation system disclosed herein.

Due to the large number of feature scores 804 that are generated by the multiple translation and language models, the traditional line search approach to machine translation system optimization is insufficient. In order to address this consideration, and potentially others, the statistical machine translation system disclosed herein utilizes a large-scale discriminative training process 802 to generate optimized model weights 514 for the various feature scores 804. As mentioned above, in one configuration the MIRA algorithm is utilized to implement the large-scale discriminative training process 802. Other algorithms can also be utilized in other configurations.

As illustrated in FIG. 8, the large-scale discriminative training process 802 takes additional in-domain client tuning data 604C and 604D as input. As mentioned above, the additional in-domain client tuning data 604C and 604D can include sentences, paragraphs, or other phrases in the source and target languages that were not included in the client training data 604A and 604B. Additionally, the additional in-domain client tuning data 604C and 604D may include text of a type that is similar to the input segments 524 that will be encountered during production use of the machine translation system 600.

The large-scale discriminative training process 802 utilizes the additional client tuning data 604C and 604D and the feature scores 804 generated by the various translation and language models to optimize the model weights 514. The large-scale discriminative training process 802 also utilizes the cluster map 716 to map the additional client data 604 in the target language into clusters. Once the model weights 514 have been generated, they can then be applied to feature scores 804 for phrases in the candidate translations at run time. Additional details regarding this process are provided below.

It should be appreciated that, in one configuration, the statistical machine translation system described above does not have any in-domain client training data 604 available at the time of initial training. In this scenario, the translation package 516 can be generated utilizing only the out-of-domain training data 602. Subsequently, as in-domain client data is received, such as post-edited translations generated by the machine translation system, the system can be rapidly adapted in the manner described below with regard to FIGS. 9A-9B. In this manner, the statistical machine translation system can be implemented without the requirement of any in-domain client training data 604 initially. This can also reduce the time required to initially build the translation package 516.

In another scenario, the in-domain client training data 604 is extracted from the out-of-domain background training data 602. For example, and without limitation, a portion of the non-domain-specific background training data 602 that is relevant to the text to be translated at run time can be extracted from the non-domain-specific background training data 602. The relevant portion of the non-domain-specific background training data 602 can be selected utilizing various statistical methods. For example, and without limitation, various mechanisms can be utilized to select a portion of the out-of-domain data that is most similar to the data to be translated. This can be done in several ways. In particular, out-of-domain sentences that have high n-gram overlap (for example, phrases of two consecutive words) with the monolingual or in-domain data can be utilized as in-domain data. As another example, sentences that have a high likelihood according to a statistical language model trained on the monolingual in-domain data can also be utilized as in-domain data. Other mechanisms may be utilized in other configurations. The selected subset of the non-domain-specific background training data 602 can then be utilized as the initial set of in-domain client training data 604.

Figure 9A:
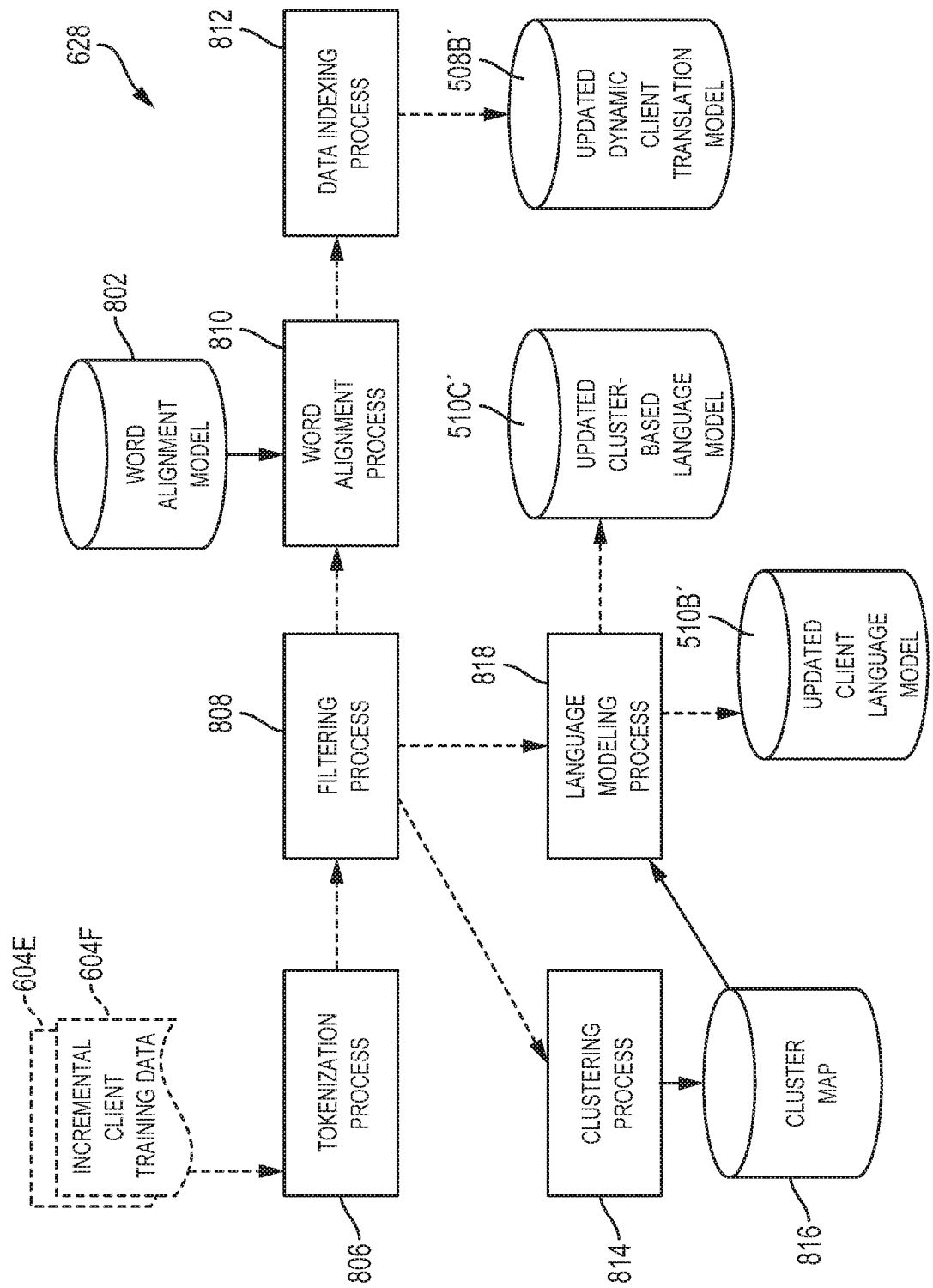
FIG. 9A is a block diagram showing aspects of the operation of the workflow shown in FIG. 6 for rapid adaptation of the dynamic translation models and the language models.

FIG. 9A is a system architecture diagram showing aspects of the operation of the workflow 628 shown in FIG. 6 for rapid adaptation of the dynamic translation models 508 and the language models 510, according to one configuration disclosed herein. As discussed briefly above, the workflow 628 provides functionality for rapid adaptation of the dynamic translation models 508, the language models 510, and the model weights 514. In order to perform rapid adaption of these components, the workflow 628 takes as input incremental in-domain client training data 604E-604F. For example, translations generated by MT engine 206 might be post-edited by human translators to ensure that they are accurate translations of the associated input segment. As discussed above, an appropriate computer-generated user interface can be provided through which human post-editors can supply post-edited translations. A user's selection of a back-translation of an alternate N-best MT result in response to the tagging of an outgoing message, as discussed above, is one example of such a post-edited translation. The input segments and their corresponding post-edited translations can then be utilized as the incremental client training data 604E-604F for use in rapidly adapting the dynamic translation models 508, the language models 510, and the model weights 514.

The in-domain incremental client training data 604E-604F is first tokenized by the tokenization process 806 described above. The filtering process 808, which was also described above, can then be applied to the incremental client training data 604E-604F. The word alignment process 810 can then utilize the previously learned word alignment model 802 to word align text in the incremental client training data 604E-604F. By using the previously generated word alignment model 802, word alignment of the incremental client training data 604E-604F can be performed more quickly than if word alignment were performed from scratch.

Once the incremental client training data 604E-604F has been tokenized, filtered, and word-aligned, the data indexing process 812 creates an updated dynamic client translation model 508B' by indexing the incremental client training data 604E-604F. For example, and without limitation, in configurations where the dynamic client translation model 508B is implemented using a suffix array data structure, the incremental client training data 604E-604F can be added to the suffix array data structure in order to create the updated dynamic client translation model 508B'.

As shown in FIG. 9A, the tokenized and filtered incremental client training data 604F in the target language can also be provided to the clustering process 814 and the language modeling process 818. The clustering process 814 can utilize the incremental client training data 604F in the target language to update the cluster map 816. Once the cluster map 816 has been updated, the language modeling process 818 can utilize the updated cluster map 816 to update the cluster-based language model 510C and create an updated cluster-based language model 510C'. Similarly, the language modeling process 818 can utilize the incremental client training data 604F in the target language to create an updated client language model 510B'.

In one particular configuration, an out-of-band process can be performed for identifying newly formed Brown clusters that are not well defined. This process can also work proactively to obtain data to build out the newly formed Brown clusters. For example, and without limitation, sentence variants can be recommended based on existing training data, or a search may be made for variants across a cross-domain training repository. In this manner, the cluster map 816 can be independently improved out-of-band without relying on the availability of new training data (i.e. the incremental client training data 604E-604F).

As will be described in greater detail below, the workflow 628 illustrated in FIGS. 9A and 9B can also generate an updated translation package containing the updated client language model 510B', the updated cluster-based language model 510C', the updated dynamic client translation model 508B', and updated model weights. The updated translation package can then be deployed to the service provider network 620 in place of the previous version of the translation package 516.

Figure 9B:
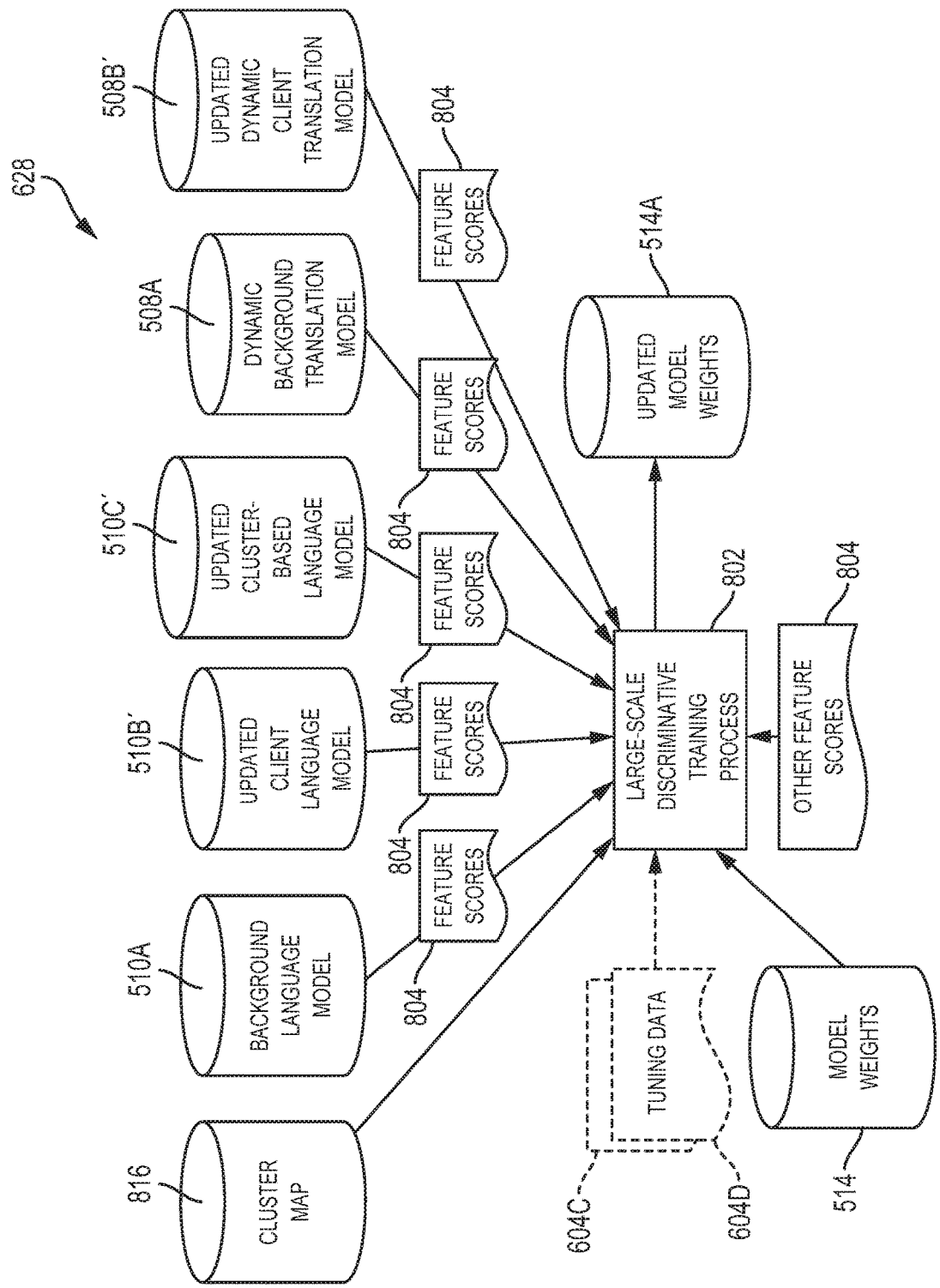
FIG. 9B is a block diagram showing additional aspects of the operation of the workflow shown in FIG. 6 for rapid adaptation of the model weights.

FIG. 9B is a system architecture diagram showing additional aspects of the operation of the workflow 628 shown in FIG. 6 for rapid adaptation of the model weights 514, according to one configuration disclosed herein. As discussed above, the large-scale discriminative training process 802 can also be utilized to generate updated model weights 514A for the updated dynamic client data translation model 508B', the updated cluster-based language model 510C', and the updated client language model 510B'. For example, and without limitation, the MIRA algorithm discussed above can utilize the additional client tuning data 604C-604D (which may or may not be the same tuning data used to generate the initial model weights 514) and the previously generated model weights 514 to generate updated model weights 514A utilizing fewer iterations than required to generate the initial model weights 514.

As mentioned above, an updated translation package (not shown in FIG. 9B) can then be created that includes the updated dynamic client data translation model 508B', the updated cluster-based language model 510C', the updated client language model 510B', and the updated model weights 514A. The updated translation package can then be deployed to the service provider network 620 in place of the previous version of the translation package 516.

As also mentioned briefly above, comparative testing is performed in some configurations between the earlier version of the translation package 516 and the updated translation package. The updated translation package can then be deployed, such as within the service provider network 620, in place of the previously deployed translation package 516 based upon the results of the testing. For example, and without limitation, the updated translation package is deployed in one configuration if the quality of the translations it generates are as good as or better than translations generated by the previously deployed translation package 516.

Figure 10:
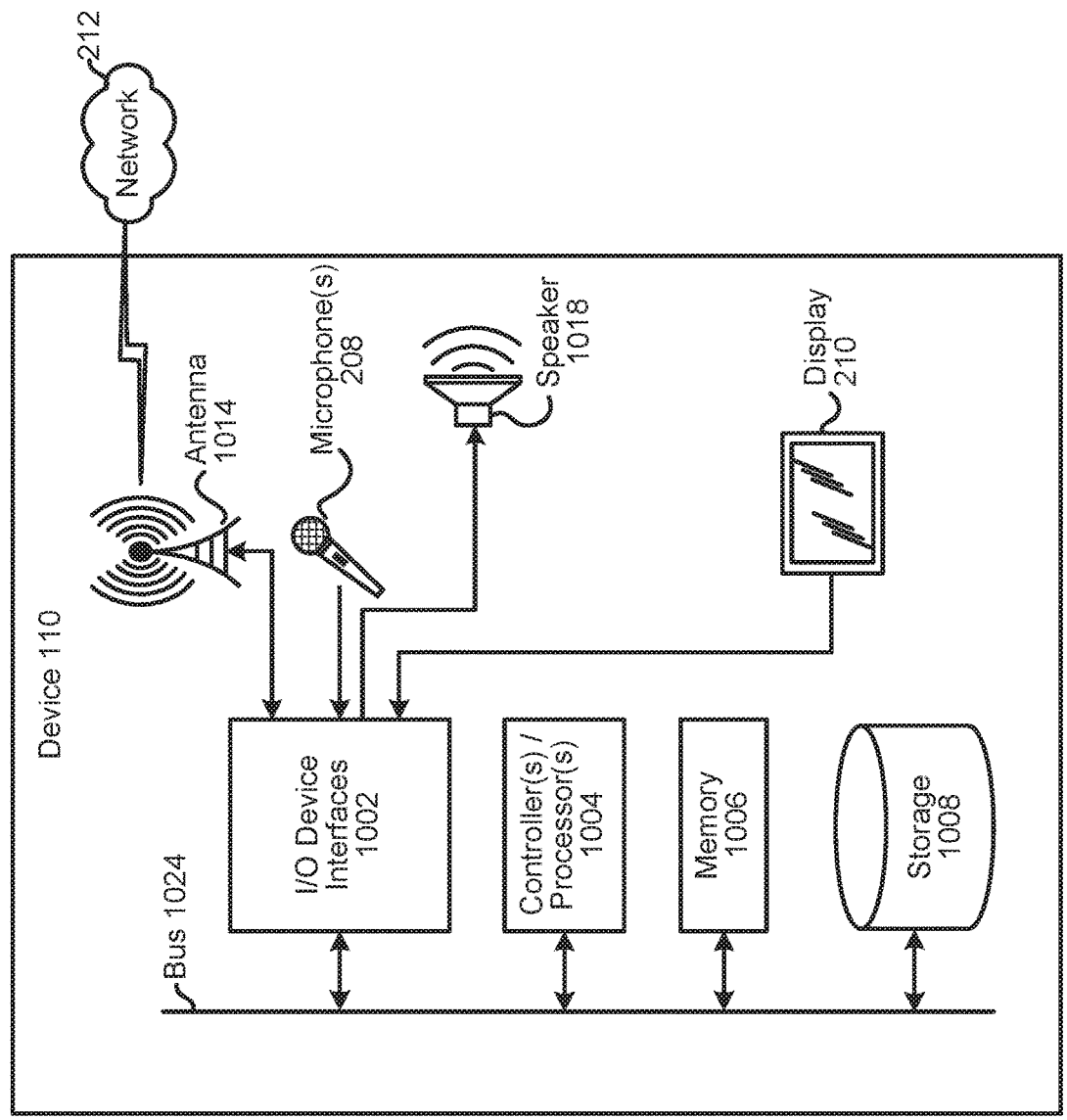
FIG. 10 is a block diagram conceptually illustrating example components of a device according to embodiments of the present disclosure.
Figure 11:
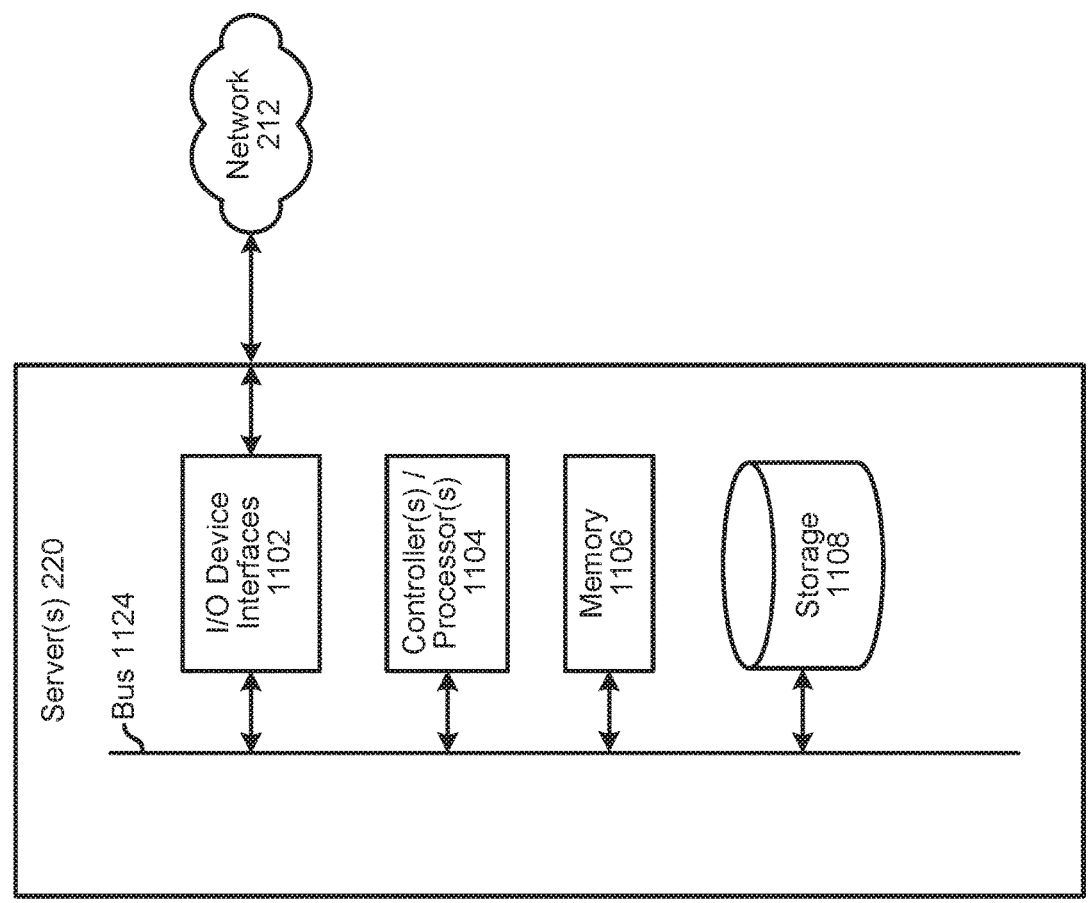
FIG. 11 is a block diagram conceptually illustrating example components of a server according to embodiments of the present disclosure.

FIG. 10 is a block diagram conceptually illustrating a computing device 110 that may be used with the described system. FIG. 11 is a block diagram conceptually illustrating example components of a remote device, such as the server 220, that may incorporate the messaging engine 202, the ASR engine 204, and/or the MT engine 206 described herein. Multiple servers 220 may be included in the system 200, such as one server 220 for running the messaging engine 202, one server 220 for running the ASR engine 204, and one server for running the MT engine 206. In operation, each of these devices (or groups of devices) may include computer-readable and computer-executable instructions that reside on the respective device (110/220), as will be discussed further below.

Each of these devices (110/220) may include one or more controllers/processors (1004/1104) that may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive (MRAM) and/or other types of memory. Each device (110/220) may also include a data storage component (1008/1108), for storing data and controller/processor-executable instructions. Each data storage component may individually include one or more non-volatile storage types such as magnetic storage, optical storage, solid-state storage, etc. Each device (110/220) may also be connected to removable or external non-volatile memory and/or storage (such as a removable memory card, memory key drive, networked storage, etc.) through respective input/output device interfaces (1002/1102).

Computer instructions for operating each device (110/220) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/220) includes input/output device interfaces (1002/1102). A variety of components may be connected through the input/output device interfaces (1002/1102), as will be discussed further below. Additionally, each device (110/220) may include an address/data bus (1024/1124) for conveying data among components of the respective device. Each component within a device (110/220) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1018, a presentation/visual output component such as a display screen 210, a wired headset or a wireless headset (not illustrated), or other component capable of outputting audio. The display screen 210 may output image and/or video data as described herein. The device 110 may also include an audio capture component. The audio capture component may be, for example, a microphone 208 or array of microphones, a wired headset or a wireless headset (not illustrated), etc. The microphone 208 may be configured to capture audio. If an array of microphones is included, approximate distance to a sound's point of origin may be determined by acoustic localization based on time and amplitude differences between sounds captured by different microphones of the array.

For example, via antenna(s) 1014, the input/output device interfaces 1002 may connect to one or more networks 212 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, etc. A wired connection such as Ethernet may also be supported. Through the network(s) 212, the speech processing system may be distributed across a networked environment.

The device 110 and/or the server 220 may include components of a messaging engine 202, an ASR engine 204, and/or an MT engine 206, such as those described above. In some implementations, the ASR engine 204 in the device 110 may be of limited or extended capabilities. The ASR engine 204 may include the language models 454 stored in ASR model storage component 452. If limited speech recognition is included, the ASR engine 204 may be configured to identify a limited number of words, whereas extended speech recognition may be configured to recognize a much larger range of words.

As noted above, multiple devices may be employed in a single speech processing system. In such a multi-device system, each of the devices may include different components for performing different aspects of the messaging, ASR, and MT functionality described herein. The multiple devices may include overlapping components. The components of the device 110 and the server 220, as illustrated in FIGS. 10 and 11, are exemplary, and may be located as a stand-alone device or may be included, in whole or in part, as a component of a larger device or system.

Figure 12:
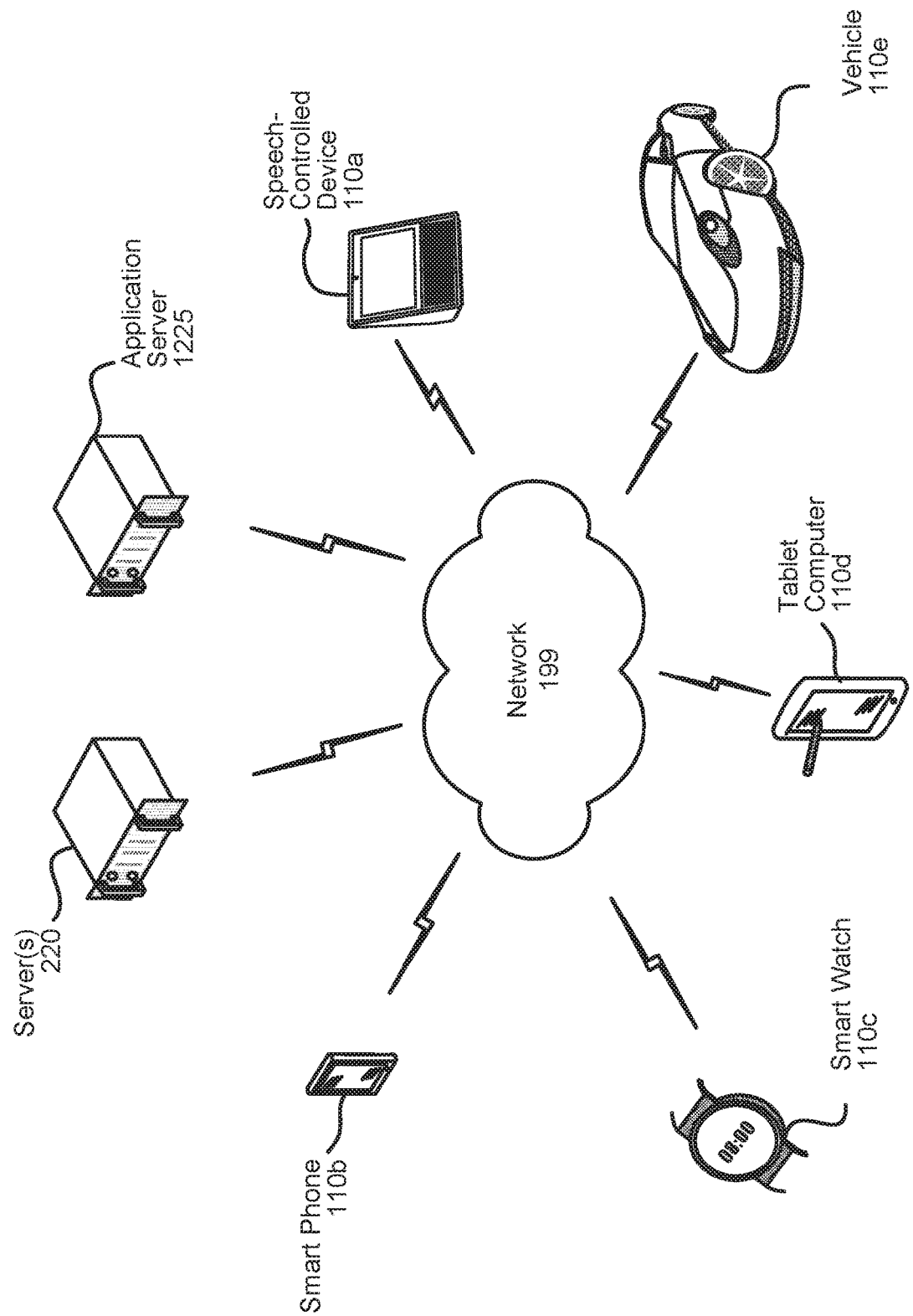
FIG. 12 illustrates an example of a computer network for use with the system.

As illustrated in FIG. 12, multiple devices (220, 110, 110b-110e) may contain components of the system 200 and the devices may be connected over a network 212. The network 212 may include a local or private network or may include a wide network such as the Internet. Devices may be connected to the network 212 through either wired or wireless connections. For example, the user device 110, a tablet computer 110d, a smart phone 110b, a smart watch 110c, and/or a vehicle 110e may be connected to the network 212 through a wireless service provider, over a WiFi or cellular network connection, or the like. Other devices are included as network-connected support devices, such as the server 220, application developer devices (e.g., the application server 1225), or others. The support devices may connect to the network 212 through a wired connection or wireless connection. Networked devices may capture audio using one-or-more built-in or connected microphones 208 or audio capture devices, with processing performed by messaging, ASR, MT, or other components of the same device or another device connected via the network 212, such as the messaging module 202, ASR module 204, the MT module 206, etc., of one or more servers 220.

The clauses below describe aspects of the system taught herein.

Clauses

1. A device, comprising:
    a screen;
    at least one processor: and
    at least one computer-readable medium encoded with instructions that, when executed by the at least one processor, cause the device to:
        display, on the screen, text corresponding to content of a message;
        receive a first signal corresponding to a response to the message;
        display a graphical user interface (GUI) element on the screen in association with the text, the GUI element corresponding to the response;
        detect an input corresponding to selection of the GUI element; and
        send a second signal indicating selection of the GUI element.

2. The device of clause 1, wherein:
    the device further comprises a microphone; and
    the computer-readable medium is encoded with additional instructions that, when executed by the at least one processor, cause the device to:
        send audio data representing spoken audio captured by the microphone to a remote device, the spoken audio corresponding to the content of the message;
        receive, from the remote device, the text corresponding to the content of the message;
        display the text on the screen.

3. The device of clause 1, wherein the computer-readable medium is encoded with additional instructions that, when executed by the at least one processor, cause the device to:

send the text to another device after displaying the text on the screen.

4. The device of clause 1, wherein the computer-readable medium is encoded with additional instructions that, when executed by the at least one processor, cause the device to:
   receive a third signal following transmission of the second signal, the third signal identifying a group of selectable options for amending or replacing the text;
   display, on the screen, the group of selectable options; and
   send a fourth signal indicating a selection of one of the group of selectable options.

5. The device of clause 4, wherein the computer-readable medium is encoded with additional instructions that, when executed by the at least one processor, cause the device to:
   display, on the screen, an amended or replacement version of the text corresponding the one of the group of selectable options.

6. The device of clause 4, wherein the computer-readable medium is encoded with additional instructions that, when executed by the at least one processor, cause the device to:
   receive a fifth signal following transmission of the fourth signal, the fifth signal identifying an amended or replacement version of the text;
   display, on the screen, the amended or replacement version of the text.

7. The device of clause 6, wherein:
   the device further comprises a microphone; and
   the computer-readable medium is encoded with additional instructions that, when executed by the at least one processor, cause the device to:
     send audio data representing spoken audio captured by the microphone to a remote device, the spoken audio corresponding to the content of the message;
     receive, from the remote device, the text corresponding to the content of the message;
     display the text on the screen; and
     display, on the screen, an alternate automated speech recognition (ASR) result as an item in the group of selectable options for amending or replacing the text, the alternate ASR result being identified by the third signal.

8. The device of clause 4, wherein the computer-readable medium is encoded with additional instructions that, when executed by the at least one processor, cause the device to:
   display, on the screen, a back translation of alternate machine translation (MT) result for the text as an item in the group of selectable options for amending or replacing the text, the alternate MT result being identified by the third signal.

9. A method executed by at least one server, comprising:
   receiving a first signal from a first computing device, the first signal identifying a graphical user interface (GUI) element associated with first text displayed on a first screen of the first computing device;
   sending a second signal to a second computing device, the second signal instructing the second computing device to display the GUI element in association with second text displayed on a second screen of the second computing device;
   receiving a third signal from the second computing device, the third signal indicating selection of the GUI element or a menu option associated with the GUI element; and
   executing at least one operation based on the third signal.

10. The method of clause 9, wherein the first text is in a first language and the second text is in a second language, and the method further comprises:
   converting the second text into the first text; and
   sending the first text to the first computing device.

11. The method of clause 10, further comprising:
   receiving audio data representing spoken audio captured by a microphone of the second computing device;
   converting the audio data into the second text; and
   sending the second text to the second computing device.

12. The method of clause 10, further comprising:
   receiving the second text from the second computing device.

13. The method of clause 9, further comprising:
   receiving audio data representing spoken audio captured by a microphone of the second computing device;
   converting the audio data into the second text; and
   sending the second text to the second computing device.

14. The method of clause 9, further comprising:
   receiving the second text from the second computing device.

15. The method of clause 9, wherein executing at least one operation comprises:
   identifying a group of selectable options for amending or replacing the second text; and sending a fourth signal to the second computing device, the fourth signal identifying the group of selectable options.

16. The method of clause 15, further comprising:
   receiving a fifth signal from the second computing device following transmission of the fourth signal, the fifth signal indicating selection of one of the group of selectable options;
   determining an amended or replacement version of the second text based on the fifth signal;
   determining an amended or replacement version of the first text based on the amended or replacement version of the second text; and
   sending the amended or replacement version of the first text to the first computing device.

17. The method of clause 16, wherein the amended or replacement version of the first text is in a first language and the amended or replacement version of the second text is in a second language, and determining the amended or replacement version of the first text comprises:
   converting the amended or replacement version of the second text into the amended or replacement version of the first text.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of one or more of the modules and engines may be implemented as in firmware or hardware, such as the AFE 456, which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A method, comprising:
   receiving, by a first apparatus, a first user input corresponding to a first version of a message in a first language;
   receiving, by the first apparatus, a response to a second version of the message that was presented by a second apparatus, wherein the second version of the message is a translation of the first version of the message into a second language, and the response indicates that the second version of the message has been identified by a user as being potentially inaccurate; and
   presenting, by the first apparatus and based at least in part on the response, at least one selectable option to cause the second apparatus to present a third version of the message that is an alternate translation of the first version of the message into the second language.

2. The method of claim 1, further comprising:
   displaying, by a screen associated with the first apparatus, text corresponding to the first version of the message.

3. The method of claim 1, wherein the first user input comprises audio data captured by a microphone of the first apparatus, and the method further comprises:
   sending the audio data to a remote device configured to perform automatic speech recognition (ASR) processing on the audio data to generate the text;
   receiving, from the remote device, the text; and
   displaying the text on the screen.

4. The method of claim 2, further comprising:
   causing the text to be translated into the second language to generate the second version of the message after displaying the text on the screen.

5. The method of claim 2, further comprising:
   displaying, in association with the text on the screen, a graphical user interface (GUI) element corresponding to the response.

6. The method of claim 5, further comprising:
   detecting a second user input corresponding to selection of the GUI element; and
   causing the first apparatus to present the at least one selectable option based at least in part on selection of the GUI element.

7. The method of claim 6, wherein:
   the screen comprises a touchscreen; and
   detecting the second user input comprises detecting, with the touchscreen, a user contact corresponding to the GUI element.

8. The method of claim 1, wherein presenting the at least one selectable option comprises presenting, by the first apparatus, a back translation of the alternate translation of the first version of the message.

9. The method of claim 1, further comprising:
   presenting, by the first apparatus and based at least in part on the response, a back translation of the second version of the message.

10. A method executed by at least one server, comprising:
    receiving, from a first computing device, first data corresponding to a first version of a message presented by the first computing device, wherein the first version of the message is in a first language;
    determining, based at least in part on the first data, second data corresponding to a second version of the message, wherein the second version of the message is in a second language which is different than the first language;
    sending, to a second computing device, the second data so as to cause the second computing device to present the second version of the message;
    receiving, from the second computing device, third data identifying a user reaction to the second version of the message presented by the second computing device, the user reaction indicating that the second version of the message is potentially inaccurate;
    sending, to the first computing device, fourth data that causes the first computing device to present an indication of the user reaction in association with the first version of the message presented by the first computing device;
    determining, based at least in part on the first data, at least one selectable response to the indication, the at least one selectable response indicating at least one option for correcting the second version of the message;
    sending, to the first computing device, fifth data that causes the first computing device to present the at least one selectable response;
    receiving, from the first computing device, sixth data indicating selection of the at least one selectable response;
    determining an amended or replacement version the second version of the message based on the sixth data; and sending, to the second computing device, seventh data that causes the second computing device to present the amended or replacement version of the second version of the message.

11. The method of claim 10, further comprising:
receiving, from the first computing device, eighth data indicating selection of a GUI element or a menu option associated with the GUI element; and wherein:
determining the at least one selectable response comprises determining the at least one selectable response based on the eighth data.

12. The method of claim 10, wherein the first data represents text corresponding to the first version of the message.

13. The method of claim 12, further comprising:
receiving audio data representing spoken audio captured by a microphone of the first computing device;
converting the audio data into the text; and
sending the text to the first computing device.

14. The method of claim 12, further comprising:
translating the text from the first language to the second language to generate the second version of the message.

15. The method of claim 14, wherein determining the at least one selectable response comprises determining a back translation of an alternate machine translation (MT) of the text into the second language as the at least one selectable response.

16. The method of claim 10, wherein determining the amended or replacement version of the second version of the message further comprises:
determining an amended or replacement version of the first version of the message based on the sixth data; and
determining the amended or replacement version of the second version of the message based at least in part on the amended or replacement version of the first version of the message.

17. The method of claim 16, wherein determining the amended or replacement version of the second version of the message further comprises:
translating the amended or replacement version of the first version of the message into the second language to generate the amended or replacement version of the second version of the message.

18. The method of claim 10, wherein the first data comprises audio data, and the method further comprises:
determining text data corresponding to the audio data; and
sending, to the first computing device, eighth data that causes the first computing device to include the text data in the first version of the message presented by the first computing device.

19. The method of claim 18, wherein determining the at least one selectable response comprises determining an alternate automated speech recognition (ASR) result for the audio data as the at least one selectable response.

20. A method, comprising:
detecting, by a microphone of a first apparatus, an utterance;
sending, by the first apparatus, data that causes a second apparatus to present a first version of a message that is based at least in part on a first automatic speech recognition (ASR) result corresponding to the utterance;
receiving, by the first apparatus, a response to the first version of the message that was presented by the second apparatus, wherein the response indicates that the first version of the message has been identified by a user of the second apparatus as being potentially inaccurate; and
presenting, by the first apparatus and based at least in part on the response, at least one selectable option to cause the second apparatus to present a second version of the message that is based at least in part on an alternate ASR result corresponding to the utterance.

21. The method of claim 20, wherein sending the data further comprises:
sending audio data corresponding to the utterance to a remote device configured to perform automatic speech recognition (ASR) processing on the audio data to generate text corresponding to the utterance.

22. The method of claim 21, further comprising:
receiving, by the first apparatus and from the remote device, the text; and
displaying, by a screen associated with the first apparatus, the text.

23. The method of claim 20, further comprising:
displaying, by a screen associated with the first apparatus, text corresponding to the first ASR result.

24. The method of claim 23, further comprising:
displaying, in association with the text on the screen, a graphical user interface (GUI) element corresponding to the response.

25. The method of claim 24, further comprising:
detecting a user input corresponding to selection of the GUI element; and
causing the first apparatus to present the at least one selectable option based at least in part on selection of the GUI element.

26. The method of claim 25, wherein:
the screen comprises a touchscreen; and
detecting the user input comprises detecting, with the touchscreen, a user contact corresponding to the GUI element.

27. The method of claim 23, further comprising:
displaying, on the screen, an amended or replacement version of the text corresponding to the at least one selectable option.

28. The method of claim 20, wherein the first ASR result is in a first language, and the method further comprises:
causing the second apparatus to present the first version of the message as a translation of the first ASR result into a second language.

* * * * *